United States Patent
Funamoto et al.

(10) Patent No.: US 11,849,249 B2
(45) Date of Patent: Dec. 19, 2023

(54) FILE GENERATION DEVICE, FILE GENERATION METHOD, FILE REPRODUCTION DEVICE, FILE REPRODUCTION METHOD, AND PROGRAM

(71) Applicant: Sony Group Corporation, Tokyo (JP)

(72) Inventors: Daisuke Funamoto, Tokyo (JP); Ryogo Ito, Tokyo (JP); Yukio Isobe, Tokyo (JP); Toshihiro Ishizaka, Tokyo (JP); Yuji Matsui, Tokyo (JP); Takaharu Yamada, Kanagawa (JP)

(73) Assignee: Sony Group Corporation, Kanagawa (JP)

( * ) Notice: Subject to any disclaimer, the term of this patent is extended or adjusted under 35 U.S.C. 154(b) by 129 days.

(21) Appl. No.: 17/441,520

(22) PCT Filed: Mar. 16, 2020

(86) PCT No.: PCT/JP2020/011363
§ 371 (c)(1),
(2) Date: Sep. 21, 2021

(87) PCT Pub. No.: WO2020/196006
PCT Pub. Date: Oct. 1, 2020

(65) Prior Publication Data
US 2022/0182576 A1    Jun. 9, 2022

(30) Foreign Application Priority Data

Mar. 28, 2019    (JP) .................. 2019-063995

(51) Int. Cl.
*H04N 5/92*    (2006.01)
*H04N 5/76*    (2006.01)
*H04N 23/60*    (2023.01)

(52) U.S. Cl.
CPC ................ *H04N 5/92* (2013.01); *H04N 5/76* (2013.01); *H04N 23/60* (2023.01)

(58) Field of Classification Search
CPC ........ H04N 5/92; H04N 5/76; H04N 21/8153; H04N 21/85406; H04N 21/858; H04N 9/8227; H04N 9/8205
(Continued)

(56) References Cited

U.S. PATENT DOCUMENTS

2014/0219639 A1    8/2014    Murakami
2018/0160156 A1    6/2018    Hannuksela
(Continued)

FOREIGN PATENT DOCUMENTS

| EP | 3107011 A | 12/2016 |
|---|---|---|
| JP | 2012-038375 A | 2/2012 |
| JP | 2014-045353 A | 3/2014 |

OTHER PUBLICATIONS

International Search Report (PCT/ISA/210), International Application No. PCT/JP2020/011363, dated May 8, 2020.
(Continued)

*Primary Examiner* — Helen Shibru
(74) *Attorney, Agent, or Firm* — Michael Best & Friedrich LLP

(57) ABSTRACT

The present technology relates to a file generation device, a file generation method, a file reproduction device, a file reproduction method, and a program capable of associating an image stored is a file with external data outside the file. A file control unit generates an association-type high efficiency image file format (HEIF) file in which an image in an HEIF file compliant with HEIF and specific information that specifies external data outside the HEIF file, the external data to be associated with the image, are stored in association with each other. Furthermore, the file control unit
(Continued)

reproduces the association-type HEIF file. The present technology can be applied to a case where an HEIF file is generated or a case where the HEIF file is reproduced.

20 Claims, 24 Drawing Sheets

(58) Field of Classification Search
USPC .......................... 386/241; 382/305; 707/756
See application file for complete search history.

(56) References Cited

U.S. PATENT DOCUMENTS

| | | | |
|---|---|---|---|
| 2022/0182576 A1* | 6/2022 | Funamoto | ............ H04N 21/858 |
| 2022/0253476 A1* | 8/2022 | Funamoto | .............. H04N 5/772 |
| 2022/0269716 A1* | 8/2022 | Funamoto | ............... G11B 27/11 |
| 2022/0309035 A1* | 9/2022 | Funamoto | ................ H04N 5/76 |
| 2023/0006818 A1* | 1/2023 | Jinnouchi | ............. H04L 9/0894 |

OTHER PUBLICATIONS

ISO/IEC 23008-12:2017, Information technology—High efficiency coding and media delivery in heterogeneous environments—Part 12: Image File Format.

* cited by examiner

FILE GENERATION DEVICE, FILE GENERATION METHOD, FILE REPRODUCTION DEVICE, FILE REPRODUCTION METHOD, AND PROGRAM

TECHNICAL FIELD

The present technology relates to a file generation device, a file generation method, a file reproduction device, a file reproduction method, and a program, and particularly relates to, for example, a file generation device, a file generation method, a file reproduction device, a file reproduction method, and a program capable of associating an image stored in a file with external data outside the file.

BACKGROUND ART

As a file format for efficiently storing an image, there is High Efficiency Image File Format (HEIF).

CITATION LIST

Non-Patent Document

Non Patent Document 1: ISO/IEC 23008-12: 2017, Information technology:—High efficiency coding and media delivery in heterogeneous environments—Part 12: Image File Format

SUMMARY OF THE INVENTION

Problems to be Solved by the Invention

Regarding an HEIF file compliant with High Efficiency Image File Format (HEIF), it is convenient if an image stored in an HEIF file could be associated with external data outside the HEIF file.

The present technology has been made in view of such a situation, and makes it possible to associate an image stored in an HEIF file with external data outside the HEIF file.

Solution to Problems

A file generation device or a first program according to the present technology is a file generation device including a file control unit that generates an association-type high efficiency image file format (HEIF) file in which an image in an HEIF file compliant with HEIF and specific information that specifies external data outside the HEIF file, the external data to be associated with the image, are stored in association with each other, or a program for causing a computer to function as such a file generation device.

A file generation method according to the present technology is a file generation method including generating an association-type high efficiency image file format (HEIF) file in which an image in an HEIF file compliant with HEIF and specific information that specifies external data outside the HEIF file, the external data to be associated with the image, are stored in association with each other.

In the file generation device, the file generation method, and the first program according to the present technology, an association-type high efficiency image file format (HEIF) file in which an image in an HEIF file compliant with HEIF and specific information that specifies external data outside the HEIF file, the external data to be associated with the image, are stored in association with each other is generated.

A file reproduction device or a second program according to the present technology is a file reproduction device including a file control unit that reproduces an association-type high efficiency image file format (HEIF) file in which an image in an HEIF file compliant with HEIF and specific information that specifies external data outside the HEIF file, the external data to be associated with the image, are stored in association with each other, or a program for causing a computer to function as such a file reproduction device.

A file reproduction method according to the present technology is a file reproduction method including reproducing an association-type high efficiency image file format (HEIF) file in which an image in an HEIF file compliant with HEIF and specific information that specifies external data outside the HEIF file, the external data to be associated with the image, are stored in association with each other.

In the file reproduction device, the file reproduction method, and the second program according to the present technology, an association-type high efficiency image file format (HEIF) file in which an image in an HEIF file compliant with HEIF and specific information that specifies external data outside the HEIF file, the external data to be associated with the image, are stored in association with each other is reproduced.

Note that the file generation device and the file reproduction device may be independent devices or internal blocks constituting one device.

Furthermore, the first program and the second program can be provided by being recorded on a recording medium or being transmitted via a transmission medium.

MODE FOR CARRYING OUT THE INVENTION

One Embodiment of Digital Camera to Which Present Technology is Applied

Figure 1:
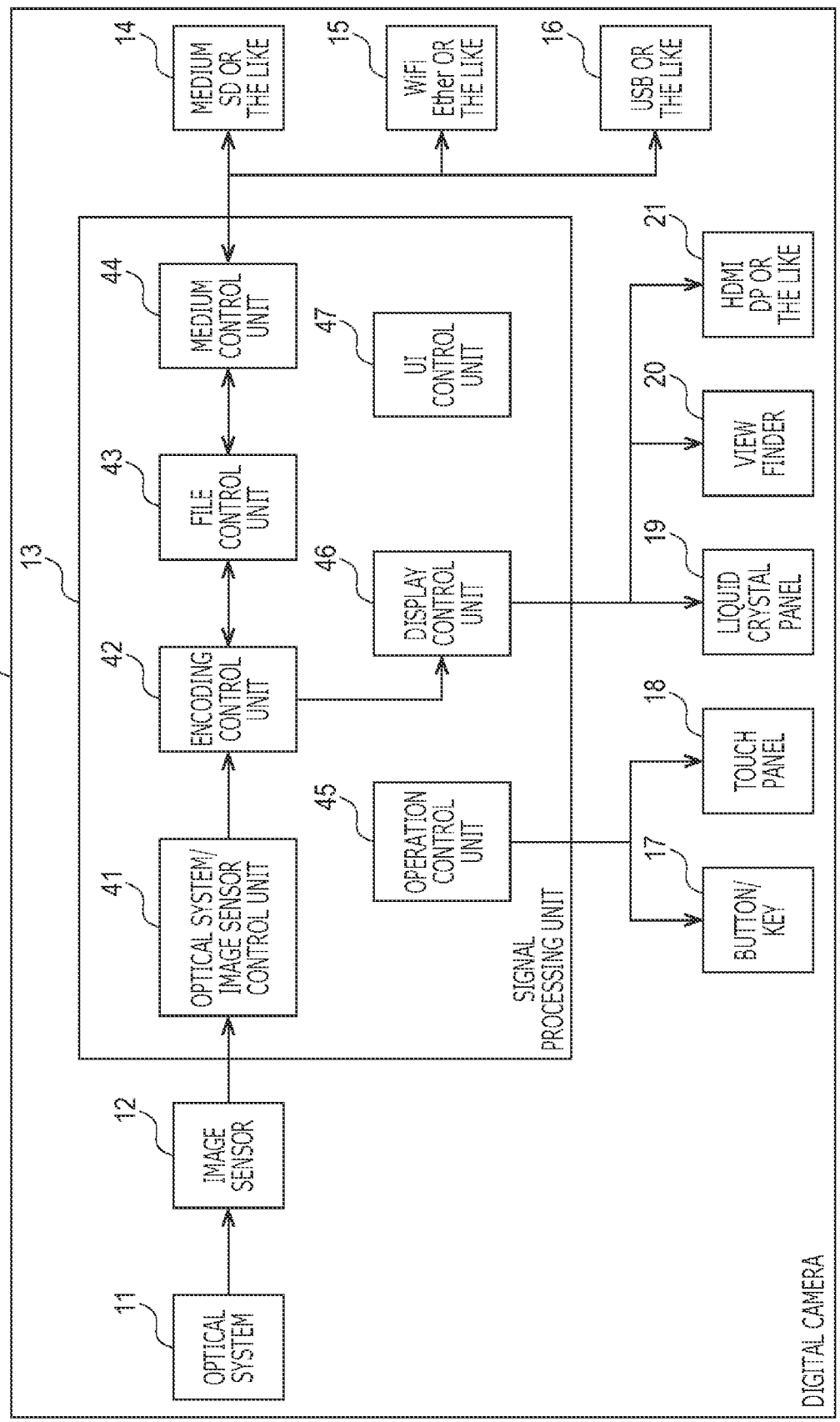
FIG. 1 is a block diagram illustrating a configuration example of one embodiment of a digital camera to which the present technology is applied.

FIG. 1 is a block diagram illustrating a configuration example of one embodiment of a digital camera to which the present technology is applied.

A digital camera 10 includes an optical system 11, an image sensor 12, a signal processing unit 13, a medium 14, interfaces 15 and 16, a button/key 17, a touch panel 18, a liquid crystal panel 19, a view finder 20, an interface 21, and the like.

The optical system 11 condenses light from a subject on the image sensor 12.

The image sensor 12 receives light from the optical system 11 and performs imaging for photoelectric conversion to generate data of an image as an electric signal and to supply the data to the signal processing unit 13.

The signal processing unit 13 includes an optical system/image sensor control unit 41, an encoding control unit 42, a file control unit 43, a medium control unit 44, an operation control unit 45, a display control unit 46, and a UI control unit 47.

The optical system/image sensor control unit 41 controls the optical system 11 and the image sensor 12, and supplies (data of) an image obtained by imaging performed in accordance with the control to the encoding control unit 42.

The encoding control unit 42 supplies the image from the optical system/image sensor control unit 41 to the display control unit 46, and moreover, encodes the image as necessary and supplies the image to the file control unit 43. Furthermore, the encoding control unit 42 decodes the image supplied from the file control unit 43 as necessary, and supplies the image to the display control unit 46.

The file control unit 43 generates a file in which the image supplied from the encoding control unit 42 is stored, and supplies the file to the medium control unit 44. Furthermore, the file control unit 43 reproduces the file supplied from the medium control unit 44, that is, reads data such as an image or the like stored in the file. For example, the image read from the file is supplied from the file control unit 43 to the encoding control unit 42.

The medium control unit 44 controls exchange of files with the medium 14 and the interfaces 15 and 16. For example, the medium control unit 44 causes a file from the file control unit 43 to be recorded on the medium 14 or to be transmitted from the interfaces 15 and 16. Furthermore, the medium control unit 44 reproduces a file from the medium 14 or causes a file to be received by the interfaces 15 and 16 and to be supplied to the file control unit 43.

The operation control unit 45 supplies an operation signal corresponding to operation of the button/key 17 or the touch panel 18 by the user to a necessary block according to the operation.

The display control unit 46 performs display control and the like to supply an image or the like supplied from the encoding control unit 42 to the liquid crystal panel 19, the view finder 20, and the interface 21 and to display the image or the like.

The UI control unit 47 manages user interface (UI) control.

The medium 14 is, for example, a storage medium such as an SD card. The interface 15 is, for example, an interface of a local area network (LAN) such as WiFi (registered trademark) or Ethernet (registered trademark). The interface 16 is, for example, a universal serial bus (USE) interface. The button/key 17 and the touch panel 18 are operated by the user when a command or other information is input to the digital camera 10. The touch panel 18 can be formed integrally with the liquid crystal panel 19. The liquid crystal panel 19 and the view finder 20 display the image or the like supplied from the display control unit 46. The interface 21 is an interface for transmitting at least an image, such as High-Definition Multimedia Interface (HDMI) (registered trademark) or Display Port (DP).

In the digital camera 10 configured as described above, the encoding control unit 42 generates, from an image in RAW data obtained by imaging by the image sensor 12 (hereinafter also referred to as a RAN image), for example, a YUV image (hereinafter also referred to as a main image) having the same resolution (number of pixels) as that of the RAW image. Moreover, from the YUV main image, the encoding control unit 42 generates, for use in display on the liquid crystal panel 19 or on an external display, for example, an YUV image (hereinafter also referred to as a screen nail image) having a lower resolution than that of the main image, as a first other image based on the main image, and generates, for use in list display, for example, a YUV image (hereinafter also referred to as a thumbnail image) having a lower resolution than that of the screen nail image, as a second other image based on the main image. The encoding control unit 42 supplies, for example, a screen nail image to the liquid crystal panel 19 via the display control unit 46 and displays the screen nail image as a so-called through-the-lens image. As the thumbnail image, for example, an image having the size of 320 pixels or less on the long side can be adopted. The size (number of pixels) of the main image can be set to, for example, two hundred times or less of that of the screen nail image as the first other image based on the main image or the thumbnail image as the second other image based on the main image. Similarly, the size of the screen nail image as the first other image based on the main image can be set to, for example, two hundred times or less of that of the thumbnail image as the second other image based on the main image. As the screen nail image, for example, an image having a resolution of 4K or more can be adopted. Furthermore, as the screen nail image, for example, a 4K (QFHD) or FHD image can be adopted according to the user's selection. Moreover, images having the same resolution can be adopted as the present image and the screen nail image in a case where images having the same resolution are adopted as a present image and a screen nail image, both the present image and the screen nail image can be stored in an HEIF file, or the present image can be stored in the HEIF file without storing the screen nail image therein. In the case of storing a present image in an HEIF file without storing a screen nail image therein, the present image can be resized and used as the screen nail image.

Furthermore, the encoding control unit 42 encodes the main image, a screen nail, image, and a thumbnail image corresponding to a RAW image (main image, a screen nail image, and a thumbnail image generated from the RAW image) as necessary, and supplies the images that have been encoded to the file control unit 43 together with the RAW image.

The file control unit 43 generates a RAW file in which the RAM image is stored, and generates an HEIF file or a JPEG file in which the corresponding main image, screen nail image, and thumbnail image (main image, screen nail image, and thumbnail image generated from the same RAW image) are stored, and supplies the HEIF file or the JPEG file to the medium control unit 44. The HEIF file is a file compliant with High Efficiency Image File Format (HEIF), and the JPEG file is a file compliant with Joint Photographic Experts Group (JPEG).

The medium control unit 44 causes the RAN file and the HEIF file or the JPEG file from the file control unit 43 to be recorded on the medium 14 or causes the RAW file and the HEIF file or the JPEG file to be transmitted from the interface 15 or 16.

Which of an HEIF file and a JPEG file is to be generated in the file control unit 43 can be selected, for example, according to the user's operation. Furthermore, as will be described later, there is an image item form and an image sequence form as formats of an HEIF file. Which of the image item form and the image sequence form is adopted can be selected, for example, according to the user's operation. Moreover, the file control unit 43 can perform inter-conversion between the HEIF file and the JPEG file according to the user's operation.

Moreover, upon generation of the HEIF file, the file control unit 43 can associate internal data (data stored in the HEIF file) in the HEIF file to be associated with external data outside the HEIF file (data not stored in the HEIF file) and specific information that specifies the external data, and store the internal data and the specific information in the HEIF file in association with each other. The HEIF file in which the internal data and the specific information of the external data to be associated with the internal data are stored in association with each other is also referred to as an association-type HEIF file. In the association-type HEIF file, the internal data and the specific information can be stored in association with each other, for example, by storing association information associating the internal data and the specific information.

JPEG File

Figure 2:
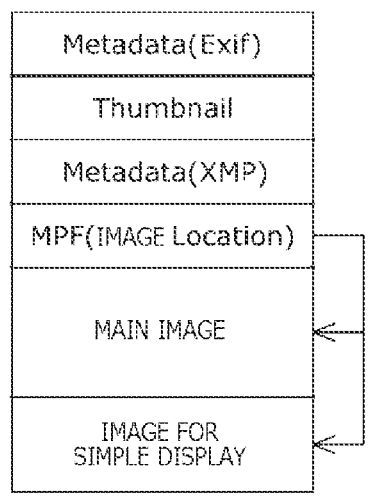
FIG. 2 is a diagram illustrating an example of a format of a Joint Photographic Experts Group (JPEG) file compliant with JPEG.

FIG. 2 is a diagram illustrating an example of a format of a Joint Photographic Experts Group (JPEG) file compliant with JPEG.

The JPEG file is configured to store, for example, Exif metadata, a thumbnail image, Extensible Metadata Platform (XMP) (registered trademark) metadata, an MPF representing storage locations (positions) or the like of a main image and a simplified display image, the main image, and the simplified display image. As the simple display image, for example, a screen nail image can be adopted.

ISO Base Media File Format

Figure 3:
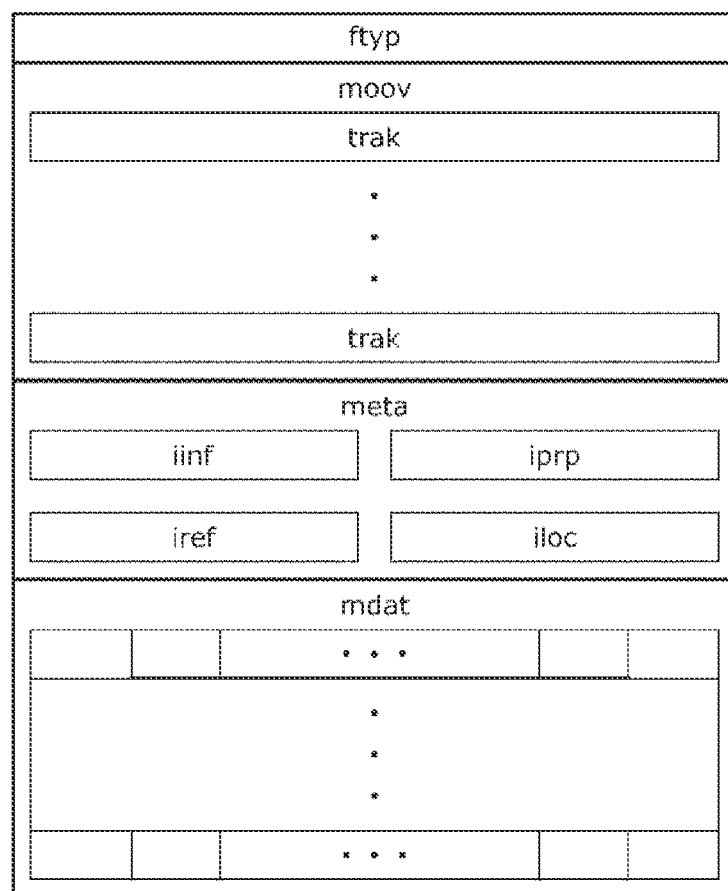
FIG. 3 is a diagram illustrating an example of an ISO base media file format.

FIG. 3 is a diagram illustrating an example of an ISO base media file format.

HEIF (ISO/IEC 23008-12) is a file format compliant with ISO Base Media File Format (ISO/IEC 14496-12), and therefore, an HEIF file is compliant with ISO Base Media File Format.

ISO base media file format includes units called boxes as containers for storing data, and has a structure called a box structure.

The box includes a type (box type), actual data (data), and the like. The type represents the type of actual data in the box. As the actual data, reproducible media data such as image (still image, moving image), audio, or a caption (subtitle), an attribute name (field name), an attribute value (field value) of (a variable represented by) the attribute name, and various other pieces of data can be adopted.

Moreover, a box can be adopted as actual data. That is, a box can have a box as actual data, and therefore a hierarchical structure is realized.

A base media file compliant with the ISO base media file format can include an ftyp box, a moov box (MovieBox), a meta box (MetaBox), an mdat box (MediaDataBox), and the like. In the ftyp box, identification information for identifying the file format is stored. The moov box can store a trak box or the like. The meta box can store an iinf box, an iprp box, an iref box, an iloc box, or the like. The mdat box can store media data (AV data) and other arbitrary data.

HEIF is compliant with the ISO base media file format as described above.

HEIF File

Figure 4:
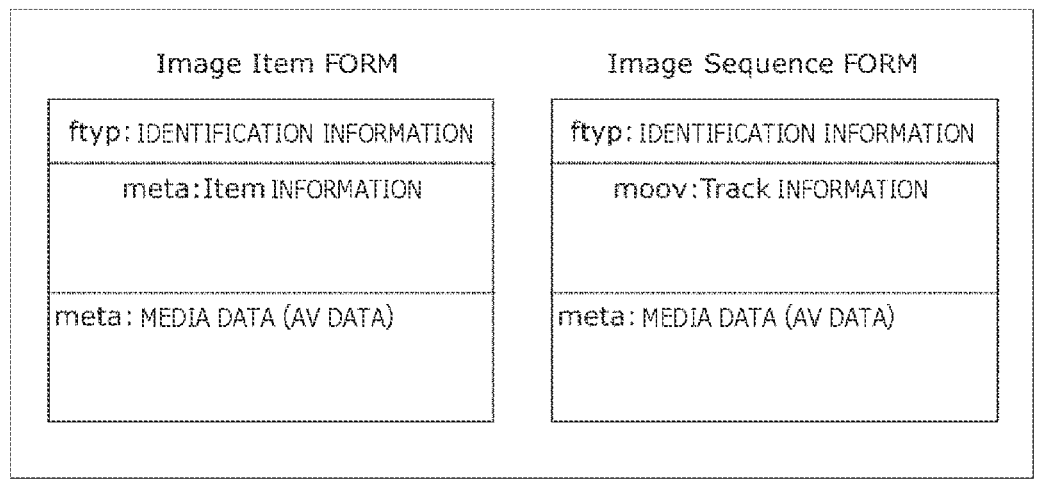
FIG. 4 is a diagram illustrating examples of a format of an HEIF file compliant with HEIF.

FIG. 4 is a diagram illustrating examples of a format of an HEIF file compliant with HEIF.

HEIF files are roughly divided into an image item form and an image sequence form. Moreover, as the image item form, there is a single image form having only one item to be described later and an image collection form having a plurality of items.

An HEIF file in the image item form includes as ftyp box, a meta box, and an mdat box.

An HEIF file in the image sequence form includes an ftyp box, a moov box, and an mdat box.

Note that an HEIF file can include not only one of the meta box and the moov box but also both the meta box and the moov box.

The ftyp box stores identification information for identifying the file format, which indicates, for example, that the file is an HEIF file in the image item for or the image sequence form.

In the meta box and the moov box, metadata necessary for reproduction, management, and the like of media data stored in the mdat box, for example, metadata such as the storage location or the like of the media data is stored.

Media data (AV data) or the like is stored in the mdat box.

In the digital camera 10, which of the HEIF file in the image item form or the HEIF file in the image sequence form is to be generated can be selected, for example, according to the user's operation. Furthermore, in a case where an image is encoded and stored in mdat of an HEIF file, only intra encoding is permitted in the image item form, and intro encoding and inter encoding are permitted in the image sequence form. Therefore, for example, in a case where priority is given to high-speed access to data stored in an HEIF file, generation of an HEIF file in the image item form can be selected, and in a case where priority is given to reducing the size (data amount) of an HEIF file, generation of an HEIF file in the image sequence form can be selected.

Figure 5:
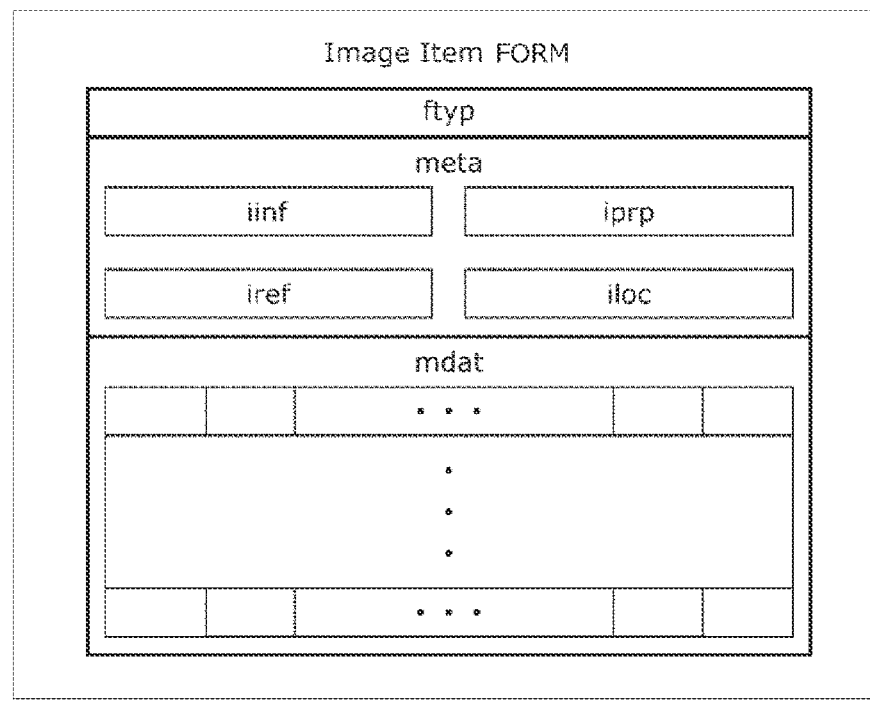
FIG. 5 is a diagram illustrating an example of a format of an HEIF file in an image item form.

FIG. 5 is a diagram illustrating an example of the format of an HEIF file in the image item form.

In an HEIF file in the image item form, information indicating that the HEIF file is in the image item form, for example, mif1 or the like is stored (as an attribute value) in the ftyp box.

In the meta box, an iinf box, an iref box, an iprp box, and an iloc box are stored.

In the iinf box, (the attribute name and the attribute value representing) the number of items which are media data (AV data) stored in the mdat box, or the like is stored. An item is one piece of data stored in the mdat box of the HEIF file in the image item form, and for example, one sheet (screen) of image is an item. In the present Description, one sheet of image is also referred to as a frame regardless of whether the image is a still image or a moving image. One frame is one item.

In the iref box, information indicating a relationship between items is stored. For example, in the mdat box, each of the corresponding main image, the corresponding screen nail image, and the corresponding thumbnail image can be stored as items. In a case where an item I1 as a main image, an item I2 as a screen nail image, and an item I3 as a thumbnail image are stored in the mdat box, information indicating that the item I2 is the screen nail image of the main image as the item I1 and information indicating that the item I3 is the thumbnail image of the main image as the item I1 are stored in the iref box.

In the iprp box, information regarding the property of an item is stored.

In the iloc box, information regarding the storage location of the item stored in the mdat box is stored.

In the mdat box (of the HEIF file) in the image item form, for example, a frame of an image as an item is stored. One or more items can be stored in the mdat box. Furthermore, a frame as an item can be encoded and stored in the mdat box. However, encoding of a frame as an item stored in the mdat box in the image item form is limited to intra encoding. As an encoding scheme (codec) for encoding a frame as an item, for example, HEVC or the like can be adopted.

Figure 6:
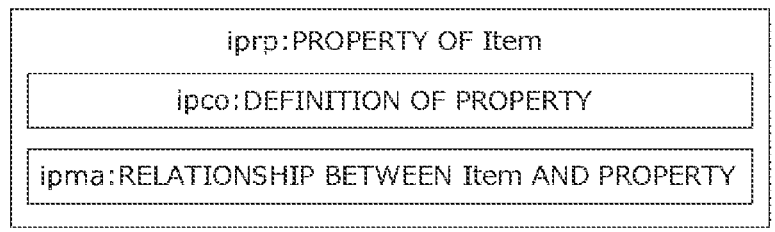
FIG. 6 is a diagram illustrating an example of an iprp box.

FIG. 6 is a diagram illustrating an example of the iprp box in FIG. 5.

In the iprp box, an ipco box and an ipma box regarding the property of the item are stored. In the ipco box, the property of the item stored in the mdat box, for example, codec information regarding the codec of the image as an item and image size information regarding the size of the image are stored. In the ipma box, an index (pointer) of the item stored in the mdat box to the property stored in the ipco box is stored.

Figure 7:
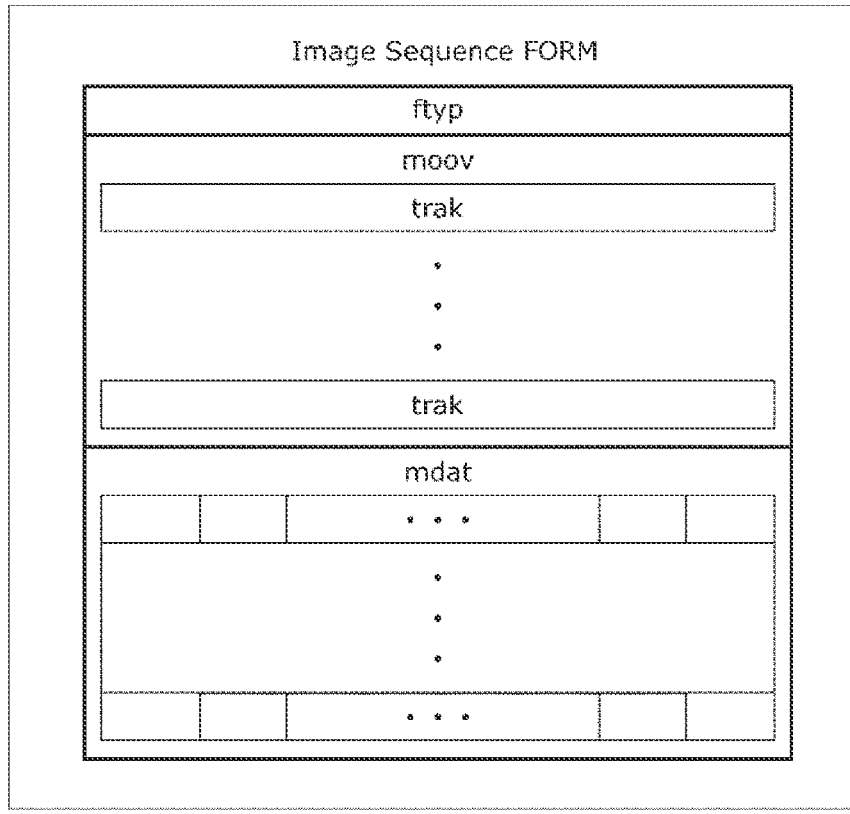
FIG. 7 is a diagram illustrating an example of a format of as HEIF file in an image sequence form.

FIG. 7 is a diagram illustrating an example of a format of an HEIF file in an image sequence form.

In the HEIF file in the image sequence form, information indicating that the HEIF file is in the image sequence form, for example, msf1 or the like is stored in an ftyp box.

In a moon box, a trek box is stored. In the trek box, information regarding a track stored in an mdat box is stored.

A track includes one independent piece of media data reproduced according to a time line, such as an image or an audio. For example, a track includes one or more frames of images to be an elementary stream. Regarding the tracks stored in the mdat box, a plurality of tracks, for example, tracks of images and audio recorded at the same time can be reproduced at the same time.

Media data of a track includes a unit called a sample. The sample is a minimum unit (access unit) in a case where media data in an HEIF file is accessed. Therefore, media data in an HEIF file cannot be accessed in units finer than the samples.

Regarding media data of an image, for example, one frame or the like is one sample. Furthermore, regarding audio media data, for example, one audio frame or the like defined in the standard of the audio media data is one sample.

In the mdat box (of the HEIF file) in the image sequence form, media data of a track is arranged in units called chunks. A chunk is a set of one or more samples arranged at logically continuous addresses.

In a case where a plurality of tracks as media data is stored in the mdat box, the plurality of tracks is interleaved and arranged in units of chunks.

In the moot box, teak boxes that manage tracks stored in the mdat box, respectively, are stored.

In the mdat box in the image sequence form, one or more tracks including media data such as an image or audio are stored. In the mdat box, a frame of an image constituting a track can be encoded and stored. In encoding of a frame constituting a track stored in the mdat box of the image sequence form, a long group of picture (GOP) can be adopted as a GOP, and both intra coding and inter coding can be adopted. As a codec for encoding a frame constituting a track, for example, HEVC or the like can be adopted.

Figure 8:
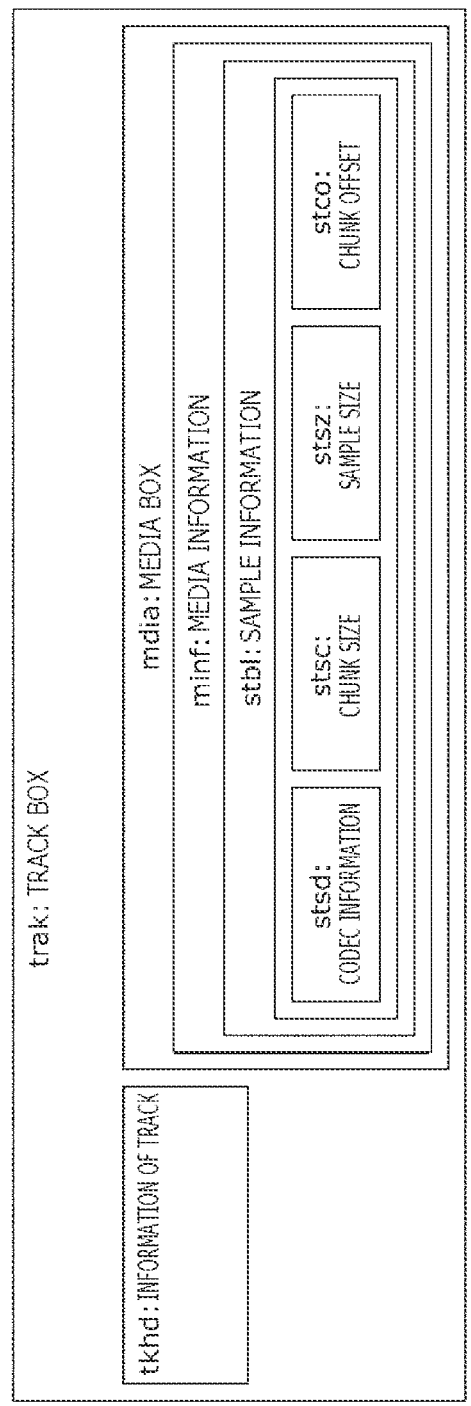
FIG. 8 is a diagram illustrating an example of a trak box.

FIG. 8 is a diagram illustrating an example of the trak box.

In the trak box, a tkhd box and an mdia box can be stored. In the tkhd box, header information of the track managed by the trak box such as creation date and time of the track is stored. In the mdia box, an minf box and the like are stored. In the minf box, an stbl box is stored. In the stbl box, an stsd box, an stsc box, an stsz box, and an stco box that store information for accessing a sample, consequently, a chunk of the track are stored. In the stsd box, codec information regarding the codec of the track is stored. In the stsc box, the chunk size (the number of samples of one chunk) is stored. In the stsz box, the sample size is stored. In the stco box, the chunk offset, that is, the offset of the arrangement position of each chunk of the track stored in the mdat box is stored.

Here, an HEIF file in the image item form is also referred to as a collection file, and an HEIF file in the image sequence form is also referred to as a sequence file. Moreover, an association-type HELP file in the image item form is also referred to as an association-type collection file, and an association-type HEIF file in the image sequence form is also referred to as an association-type sequence file.

In the digital camera 10, it is possible to generate an HEIF file (including an association-type HEIF file) in which a main image and furthermore one of a necessary screen nail image or a necessary thumbnail image or both of the screen nail image and the thumbnail image are stored.

Collection File

Figure 9:
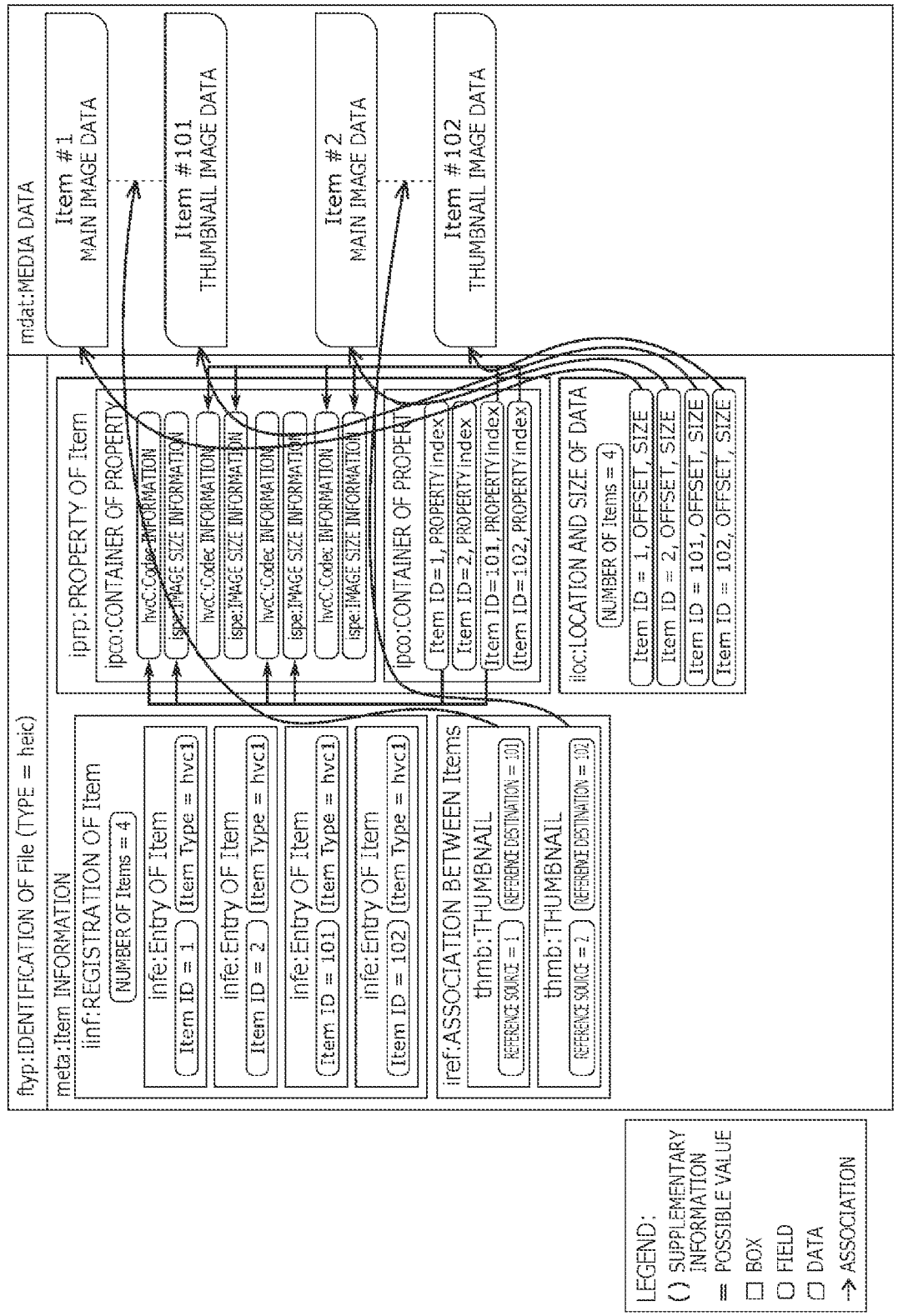
FIG. 9 is a diagram illustrating an example of a normal collection file in which a main image and a thumbnail image are stored.

FIG. 9 is a diagram illustrating an example of a normal collection file in which a main image and a thumbnail image are stored.

Here, the normal collection file means a collection file in which internal data in the collection file is not associated with specific information of external data.

Now, it is assumed that a frame (item) is encoded by HEVC and stored in the mdat box of the collection file.

In the ftyp box, as identification information for identifying the file format, heic indicating that the format is the image item form and that the codec is HEVC is stored.

In the iinf box, the number of items stored in the mdat box (the number of items) is stored. In FIG. 9, a total of four items (frames), that is, a main image (hereinafter also referred to as a main image Item #1) specified by an item ID #1, a main image Item #2, a thumbnail image (hereinafter also referred to as a thumbnail image Item #101) specified by an item ID #101, and a thumbnail image Item #102 are stored in the mdat box. Therefore, the number of items is four. Note that the thumbnail image Item #101 is a thumbnail image of the main image Item #1, and the thumbnail image Item #102 is a thumbnail image of the main image Item #2.

Moreover, in the iinf box, for example, an infe box is stored for each item stored in the mdat box. In the infe box, an item ID for specifying the item and the item type are registered. In FIG. 9, there are infe boxes of the main images item #1 and Item #2 and the thumbnail images Item #101 and Item #102.

In the iref box, for example, a thmb box is stored as information for associating items stored in the mdat box. In the throb box, a reference source and a reference destination as information for associating the main image with the thumbnail image of the main image are stored in association with each other. In the thmb box, the reference source represents the item ID of the main image, and the reference destination represents the item ID of the thumbnail image of the main image specified by the item ID of the reference source. Therefore, according to the reference destination correlated with the reference source, the item ID of the thumbnail image of the main image specified by the item ID represented by the reference source can be recognized. Furthermore, according to the reference source correlated with the reference destination, the item ID of the main image of the thumbnail image specified by the item ID represented by the reference destination can be recognized.

As illustrated in FIG. 6, the ipco box and the ipma box are stored in the iprp box. In the ipco box, as illustrated in FIG. 6, the frame property as an item stored in the mdat box, for example, codec information regarding the codec and image size information regarding the size are stored. In the ipma box, as illustrated in FIG. 6, the index of the item stored in the mdat box to the property stored in the ipco box is stored.

In the iloc box, as described in FIG. 6, information regarding the storage location of the item in the mdat box is stored. In FIG. 9, information indicating that the number of items is four is stored in the iloc box. Moreover, in the iloc box, offsets to the storage locations and the sizes of the main images Item #1 and Item #2 and the thumbnail images Item #101 and Item #102 stored in the mdat box are correlated with the item IDs and are stored.

Hereinafter, an association-type collection file in which internal data and specific information of external data are stored in association with each other in the normal collection file of FIG. 9 will be described.

Figure 10:
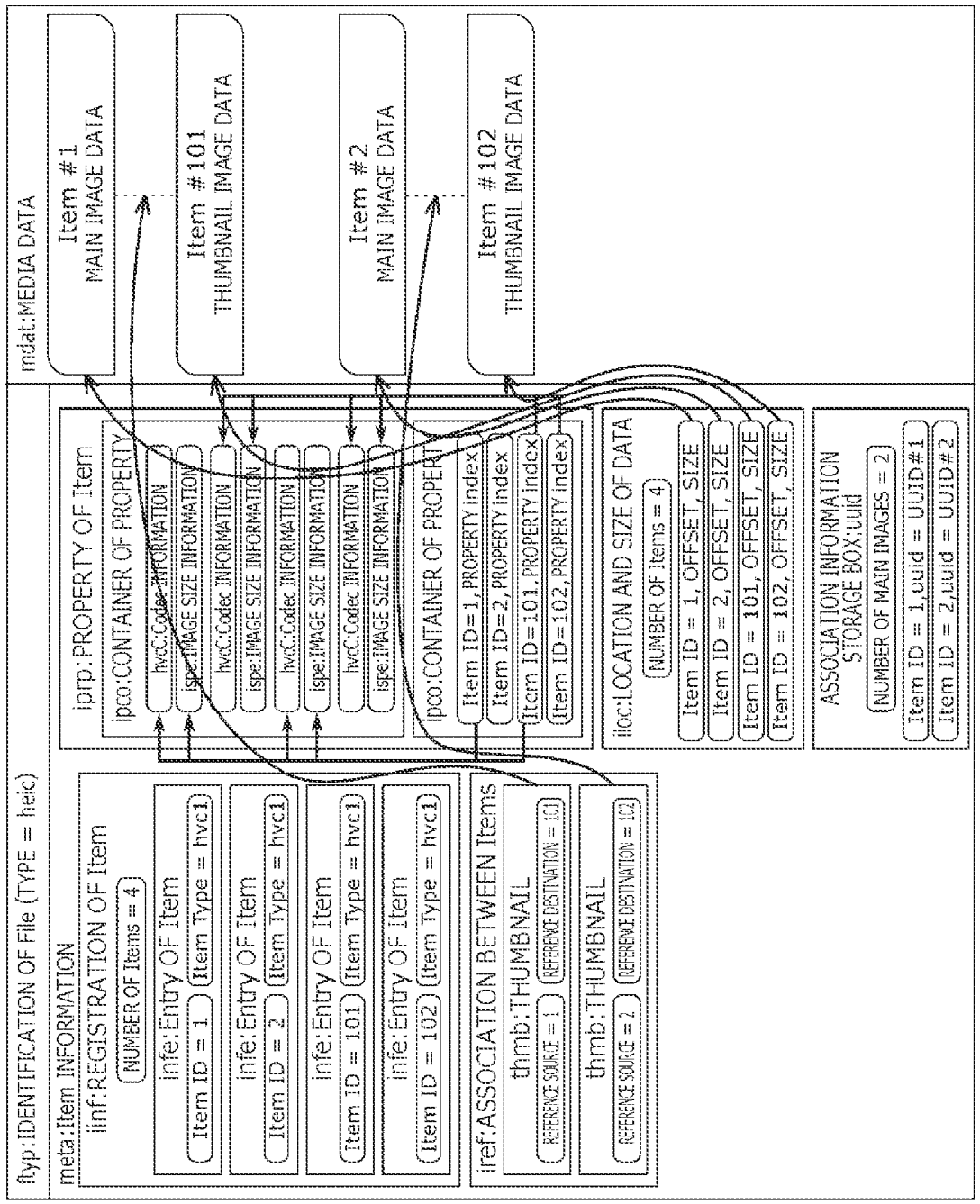
FIG. 10 is a diagram illustrating an example of a first association-type collection file.

FIG. 10 is a diagram illustrating an example of a first association-type collection file.

Here, for example, it is assumed hereinafter that a RAW file in which a RAN image of a main image as in data in an HEIF file is stored is adopted as external data to be associated with the main image.

In the first association-type collection file, association information is stored, the association information associating a main image as internal data with specific information of the RAW file (RAW file in which the RAM image of the main image as the internal data is stored) as external data, and therefore, the main image and the specific information of the RAW file are stored in association with each other. Moreover, in the first association-type collection file, association information is stored in the meta box.

As the specific information of the RAW file as the external data, the file name of the RAW file, a universally unique identifier (uuid) issued to the RAW file, a uniform resource locator (URI), and other arbitrary information that can specify the RAW file can be adopted.

Regarding the first association-type collection file, an association information storage box in which association information is stored is defined as a new box to be stored in the meta box, and is stored in the meta box. In the association information storage box of the first association-type collection file, for example, association information in which the item ID for specifying the main image is correlated with the uuid as specific information that specifies the RAW file associated with the main image is stored. Moreover, in the association information storage box, the number of main images associated with the RAW file (the number of main images) is stored. Since the number of main images stored in the association information storage box is the number of main images associated with the RAW file, the number of main images is a value equal to or less than the number of main images stored in the mdat box.

In FIG. 10, the uuid of the RAF file of the main image Item #1 is a UUID #1, and the uuid of the RAW file of the main image Item #2 is a UUID #2. Now, assuming that a RAW file whose uuid is the UUID #i is referred to as a RAW file UUID #i, in FIG. 10, association information in which an item ID #1 of the main image Item #1 is correlated with the uuid of the RAW file UUID #1, and an item ID #2 of the main image item #2 is correlated with the uuid of the RAW file UUID #2 is stored in the association information storage box.

Figure 11:
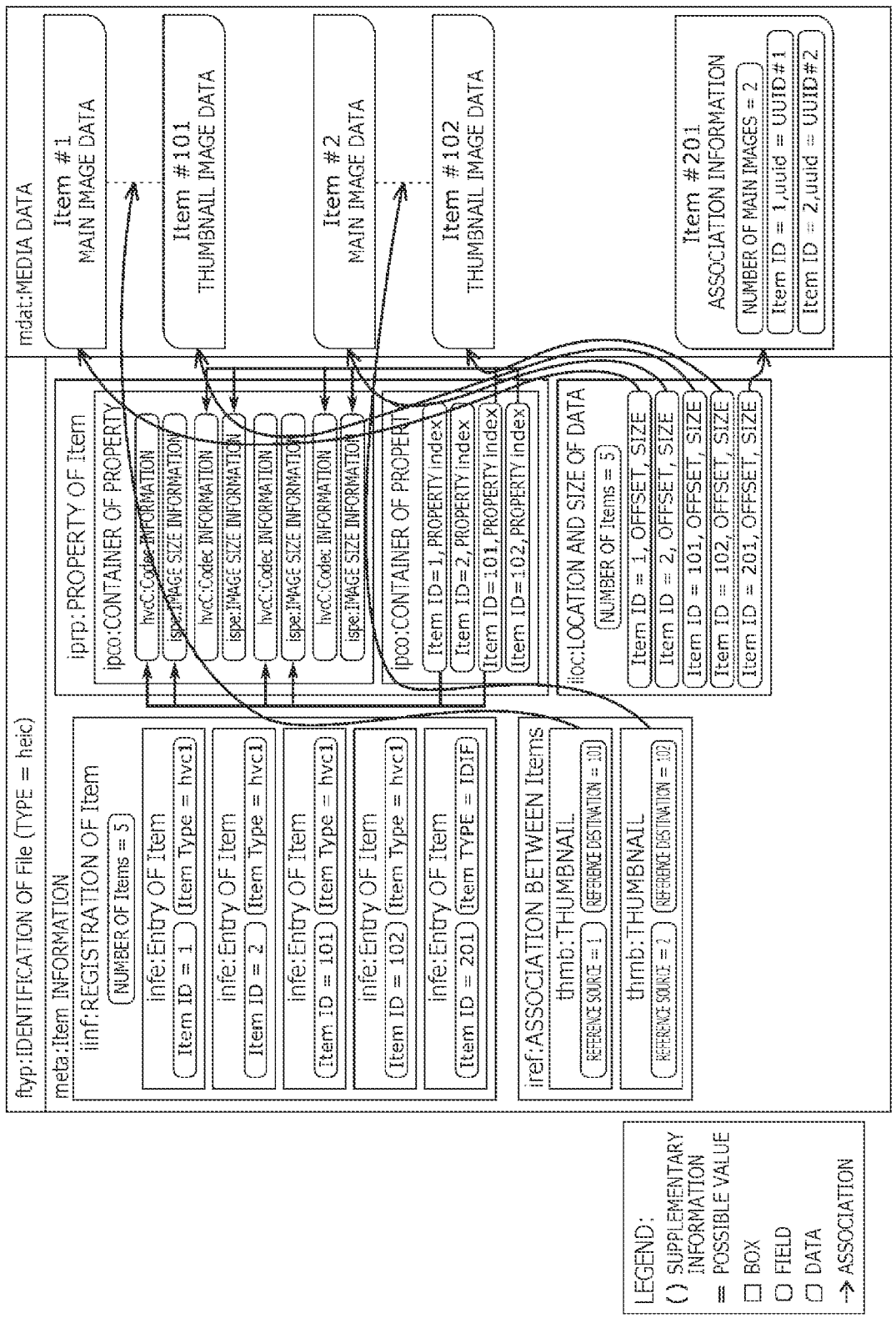
FIG. 11 is a diagram illustrating an example of a second association-type collection file.

FIG. 11 is a diagram illustrating an example of a second association-type collection file.

Similarly to the first association collection file, in the second association-type collection file, association information associating the main image as internal data with specific information of a RAW file as external data is stored, and therefore the main image and the specific information of the RAW file are stored in association with each other. However, in the second association-type collection file, the association information is stored in the mdat box.

Regarding the second association-type collection file, for example, association information similar to that of the first association collection file is stored as an item is the mdat box. In FIG. 11, the association information is stored in the mdat box as the item with an item ID #201.

As described above, in the second association-type collection file, since the association information as the item Item #201 is stored in the meta box, information stored in the mdat box is different from that of the normal collection file in FIG. 9. In the second association-type collection file, metadata of the association information as the item Item #201 is stored in the meta box.

Specifically, is the second association-type collection file, the number of items stored in the iinf box and the iloc box is changed from four in the case of FIG. 9 to five obtained by adding one, that is, the item Item #201 to four. Moreover, an infe box for the item Item #201 is added to the iinf box, and the offset to the storage location and the size of the item Item #201 are added to the iloc box. In the infe box for the item Item #201, the item ID #201 of the item Item #201 and item-type identifying data info (IDIF) indicating that the item Item #201 association information are stored. IDIF is a newly defined attribute value (field value) indicating that the item is association information, FIG. 12 is a diagram illustrating an example of a third association-type collection file.

In the third association-type collection file, specific information of a RAW file as external data is stored in the mdat box as an item for each piece of specific information, and association information associating a main image as internal data with the specific information of a RAW file as the external data is stored in the meta box, and therefore the main image and the specific information of the RAW file are stored in association with each other. However, in the third association-type collection file, association information is information in which the item ID of a main image as an item is correlated with the item ID of the specific information (of a RAW file) as an item, and is stored in a cdsc box stored in an iref box in the meta box.

In the cdsc box, a reference source and a reference destination as information for associating items as a main image with specific information of the RAW file of the main image can be correlated with each other and stored. In the cdsc box, the reference source represents the item ID of a main image, and the reference destination represents the item ID of specific information as an item of the RAW file of the main image specified by the item ID of the reference source.

Figure 12:
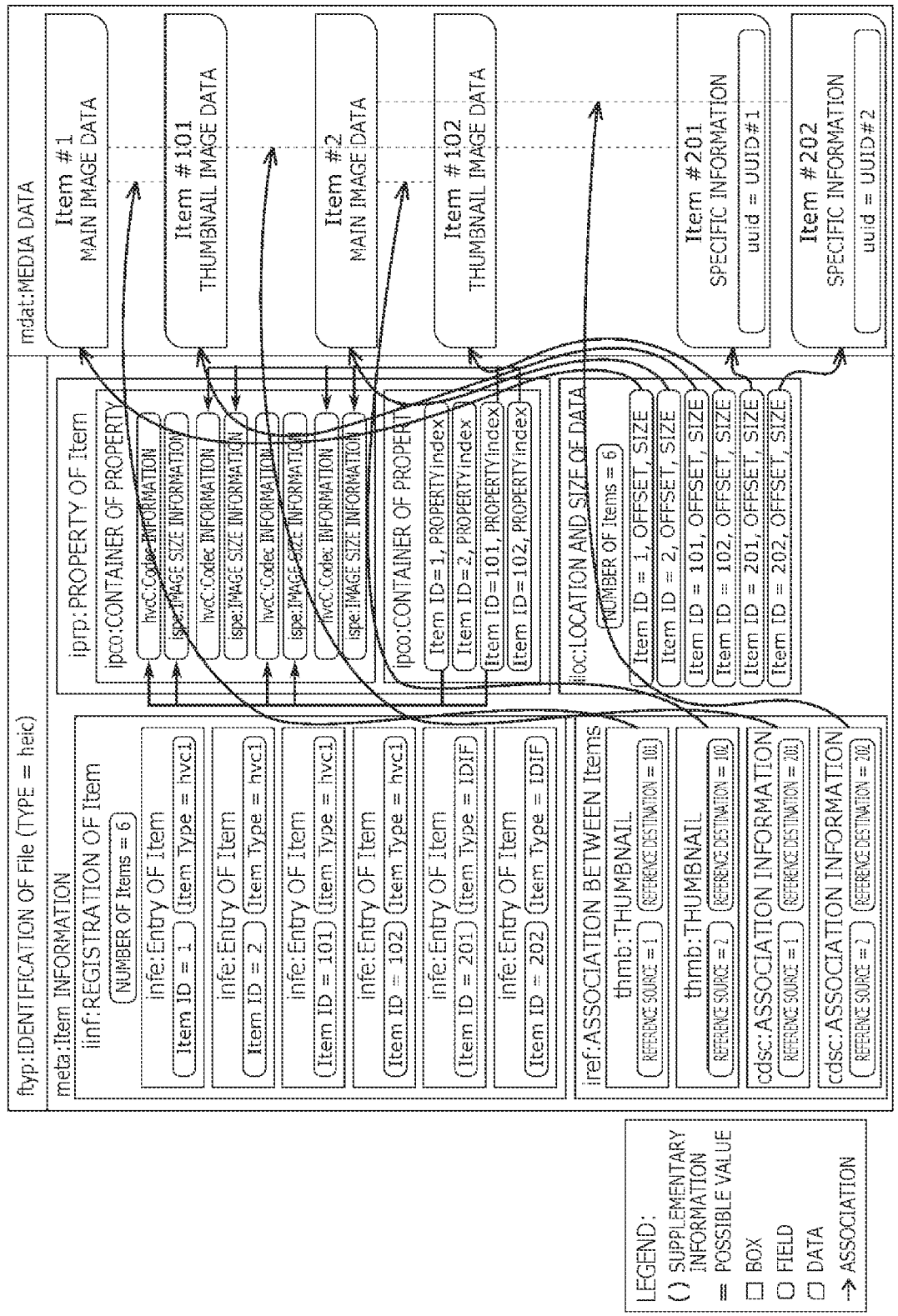
FIG. 12 is a diagram illustrating an example of a third association-type collection file.

In FIG. 12, a UUID #1, which is a uuid as specific information of the RAW file of the main image Item #1 is stored in mdat as an item Item #201, and a UUID #2, which is a uuid as specific information of the RAW file of the main image item #2 is stored in mdat as an item Item #202. Moreover, a cdsc box in which association information in which an item ID #1 of the main image Item #1 and an item ID #201 of the specific information UUID #1 are correlated with each other as a reference source and a reference destination is stored is stored in the iref box, and a cdsc box in which association information in which an item ID #2 of the main image Item #2 and the item ID #202 of the specific information UUID #2 are correlated with each other as a reference source and a reference destination is stored is stored in the iref box.

Sequence File

Figure 13:
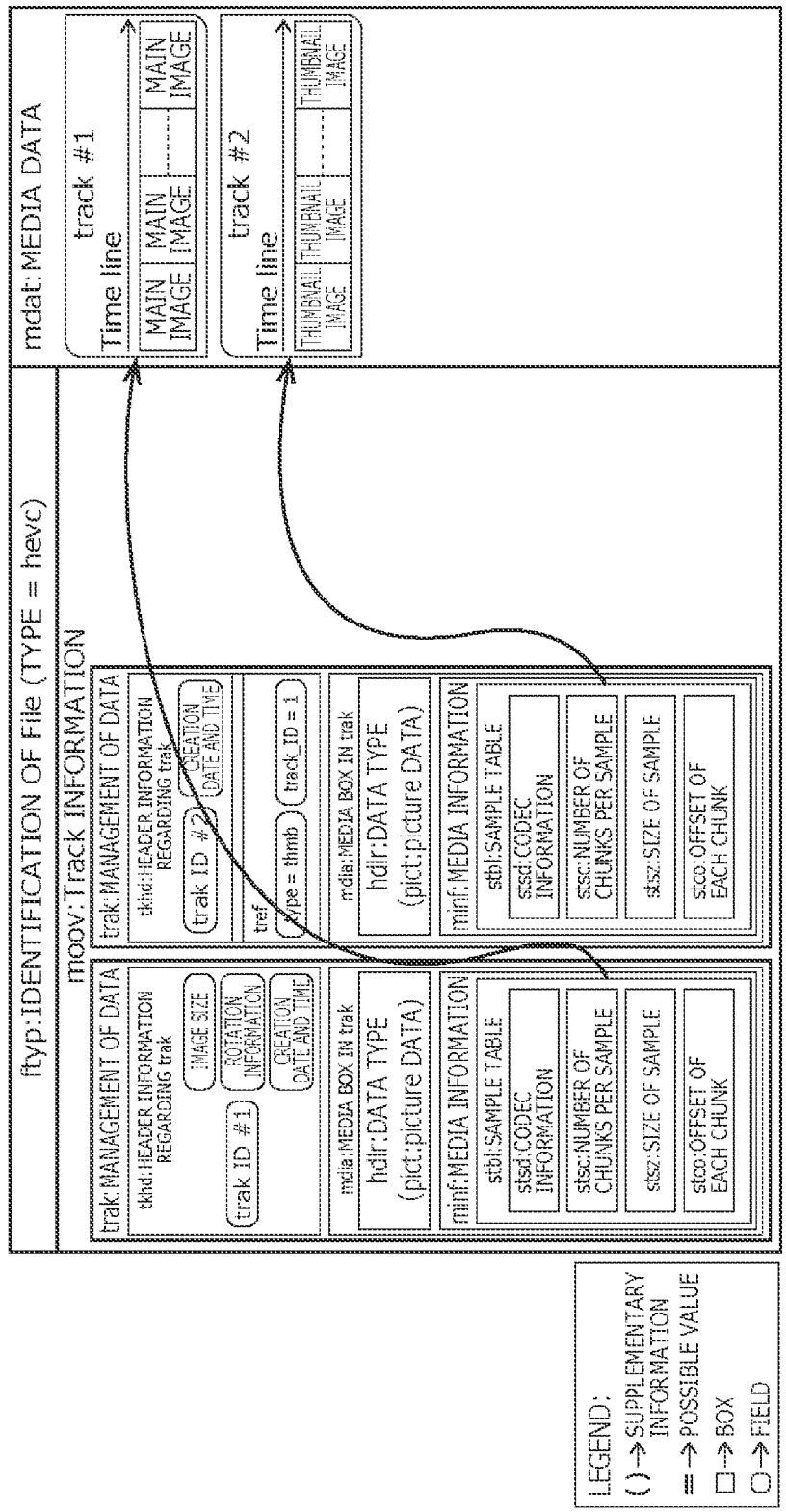
FIG. 13 is a diagram illustrating an example of a normal sequence file in which a track of main images and a track of thumbnail images of the main images are stored.

FIG. 13 is a diagram illustrating an example of a normal sequence file in which a track of main images and a track of thumbnail images of the main images are stored.

Here, the normal sequence means a sequence file in which internal data in the sequence file is not associated with specific information of external data.

Now, it is assumed that frames are encoded by HEVC and stored in the mdat box of the sequence file.

In the ftyp box, hevc indicating that the format is the image sequence form and the codec is HEVC is stored as identification information for identifying the file format.

In the moov box, as illustrated in FIG. 7, trak boxes that manage tracks stored in the mdat box, respectively, are stored. In FIG. 13, the track of the main image specified by a track ID #1 (hereinafter also referred to as track #1) and a track #2 of the thumbnail images of the main images of the track #1 are stored in the mdat box. Therefore, in the moov box, a trak box that manages the track #1 and a trak box that manages the track #2 are stored. The (frame of the) nth (from the head) thumbnail image of the track #2 is the thumbnail image of the nth main image of the track #1.

A sequence file is useful for example, in a case where a plurality of frames of main images is recorded as one track and a plurality of frames of thumbnail images is recorded as one track, the frames being obtained by continuous shooting performed by the digital camera 10 in a case where for example, the continuous shooting is performed.

In the tkhd box of the trek box that manages the track #1 of the main image, the track ID #1 that specifies the track #1, the image size of the main images constituting the track #1, rotation information indicating the orientation of the digital camera 10 when the main images are captured, and creation date and time of the track #1 are stored. In the tkhd box of the trak box that manages the track #2 of the thumbnail images, the track ID #2 that specifies the track #2 and creation date and time of the track #2 are stored.

In the trak box, in addition to the tkhd box and the mdia box illustrated in FIG. 7, a tref box can be stored. In the tref box, a track ID for specifying another track associated with the track managed by the trak box in which the tref box is stored, information indicating the content of the track, and the like are stored. In FIG. 13, a tref box is provided in the trak box that manages the track #2. Then, in the tref box, information indicating that another track related to the track #2 is the track #1 (track_ID=1) and that data constituting the track #2 is thumbnail images (track #2 is a track of thumbnail images) (type=thmb) is stored.

In the mdia box of the trek box, in addition to the mint box illustrated in FIG. 8, an hdlr box can be stored. In the hdlr box, information indicating the type of data constituting the track managed by the trek box in which the hdlr box is stored is stored. Information (pica) indicating that data constituting the track #1 is a picture (frame) is stored in the hdlr box stored (in the mdia box stored) in the trek box that manages the track #1 of the main images, and information indicating That data constituting the track #2 is a picture is stored in the hdlr box stored in the trak box that manages the track #2 of the thumbnail images.

The mint box is as illustrated in FIG. 8.

Hereinafter, an association-type sequence file in which internal data and specific information of external data are stored in association with each other in the normal sequence file of FIG. 13 will be described.

Figure 14:
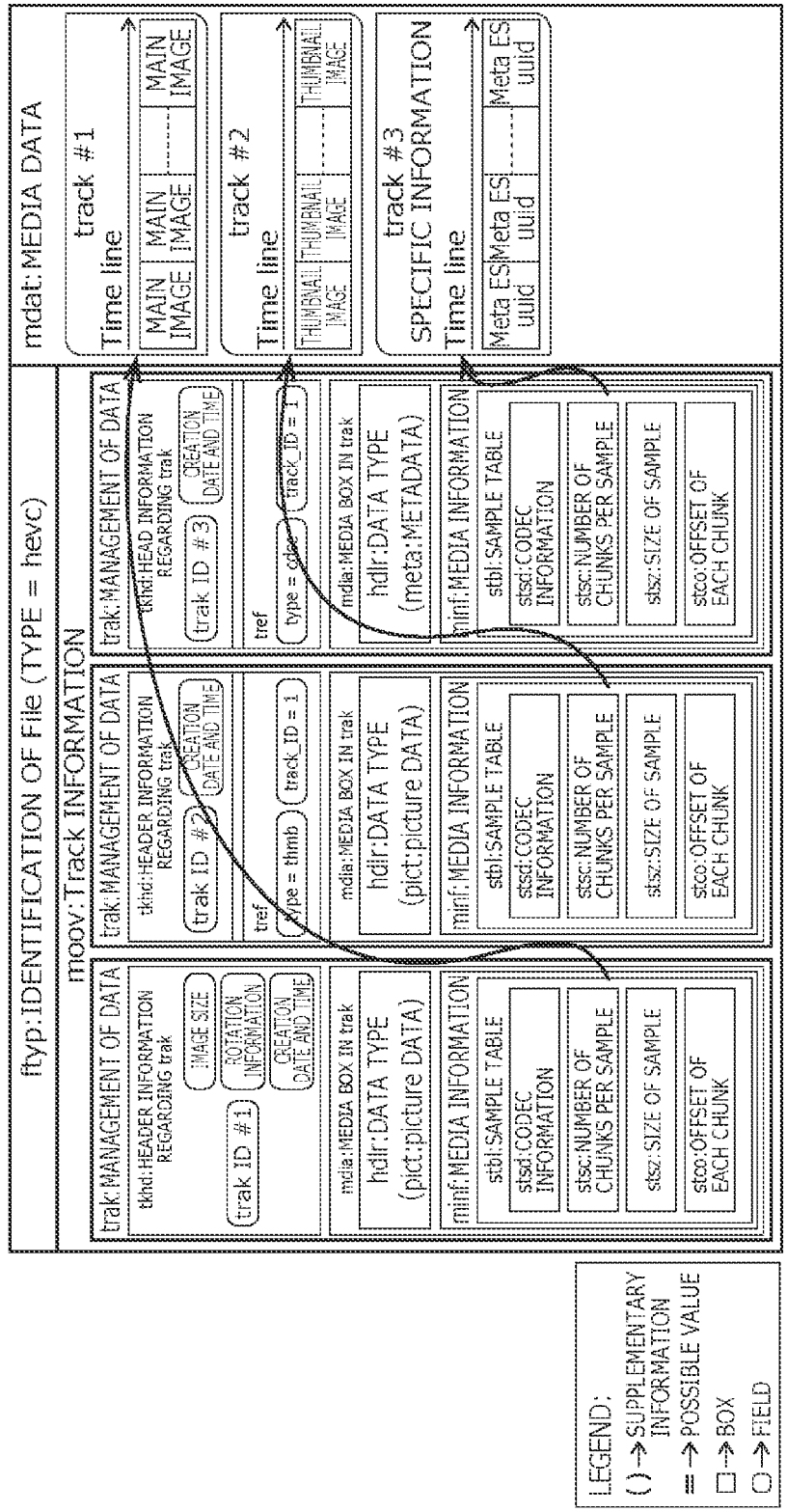
FIG. 14 is a diagram illustrating an example of an association-type sequence file.

FIG. 14 is a diagram illustrating an example of an association-type sequence file.

In the association-type sequence file, a track #3 of the (elementary) streams (Meta ESs) of uuids as specific information of RAW files as external data is added to the mdat box, and the trak box that manages the track #3 is added to the moov box.

Here, a track #1 is a time series of one or more frames of the main images arranged on a time line, and the track #3 is a time series of uuids of the RAW files of the respective frames or the main images arranged on a time line.

The nth uuid (from the head) of the track #3 is specific information of the RAW file of the nth frame of the main image of the track #1. Furthermore, (data of) the plurality of tracks stored in the mdat box can be synchronously reproduced according to time-point information on one time line. Therefore, by storing the track #1 of the main image and the track #3 of the (stream of) uuid of the RAW file of each frame of the main image constituting the track #1 in the mdat box, the nth frame of the main image of the track #1 and the uuid of the RAW file of (the frame of) the main image are stored in association with each other. In this case, it can be said that the frame of the main image of the track #1 and the uuid of the RAW file of (the frame of) the main image can be associated with each other by time-point information on the time line.

Note that it can be understood that the nth uuid (from the head) of the track #3 is specific information of the RAW file of the nth frame of the track #1, and (the frame of) the main image constituting the track #1 and the uuid constituting the track #3 are associated with each other by the order of arrangement in the track.

In the association-type sequence file, since the track #3 of the uuids of the RAN files are added to the mdat box, the trak box that manages the track #3 is added to the moov box.

In the trak box that manages the track #3 of the uuid of the RAN file, a tkhd box, a tref box, an mdia box, and the like are stored.

In the tkhd box of the trak box that manages the track #3, the track ID #3 that specifies the track #3 and the creation date and time of the track #3 are stored.

In the tref box of the trak box that manages the track #3, a track ID that specifies another track related to the track #3 managed by the trak box in which the tref box is stored, information indicating the content of the track #3, and the like are stored. Since the uuids configuring the track #3 is specific information of the RAN files of the main images configuring the track #1 and the track #3 is related to the track #1, information indicating that another track related to the track #3 is the track #1 (track_ID=1) and that the track #3 is a track of metadata (here, specific information) (type=cdsc) is stored in the tref box of the trak box that manages the track #3 in FIG. 14.

In the mdia box of the trak box that manages the track #3, an hdlr box and a minf box are stored. In the trek box that manages the track #3, information (meta) indicating that data constituting the track #3 is metadata (of the main image) is stored in the hdlr box, and an stsc box, an stsc box, an stsz box, and an stco box regarding the track #3 are stored in the minf box.

Generation and Reproduction of HEIF File

Figure 15:
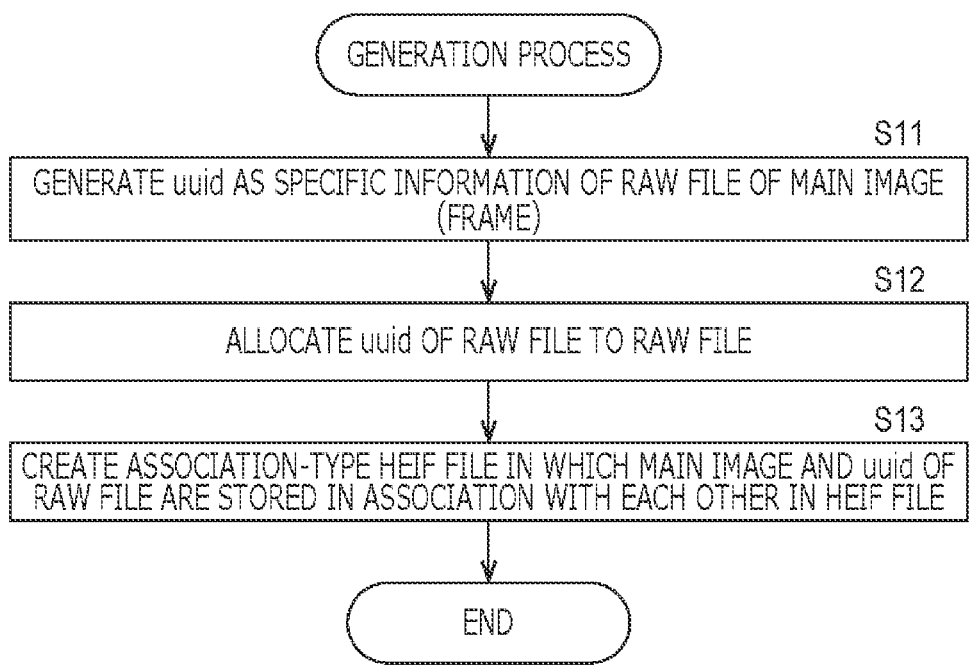
FIG. 15 is a flowchart illustrating an outline of an example of a generation process of generating an association-type HEIF file.

FIG. 15 is a flowchart illustrating an outline of an example of a generation process of generating an association-type HEIF file.

In the generation process, in step S11, the file control unit 43 generates a uuid as specific information of the RAW file of a frame of the main image, and the process proceeds to step S12.

In step S12, the file control unit 43 allocates the uuid generated in step S11 to the RAW file of the frame of the main image, and the process proceeds to step S13.

In step S13, the file control unit 43 generates an association-type HEIF file in which the frame of the main image and the uuid of the RAW file of the frame are stored in association with each other in the HEIF file, and terminates the generation process.

Figure 16:
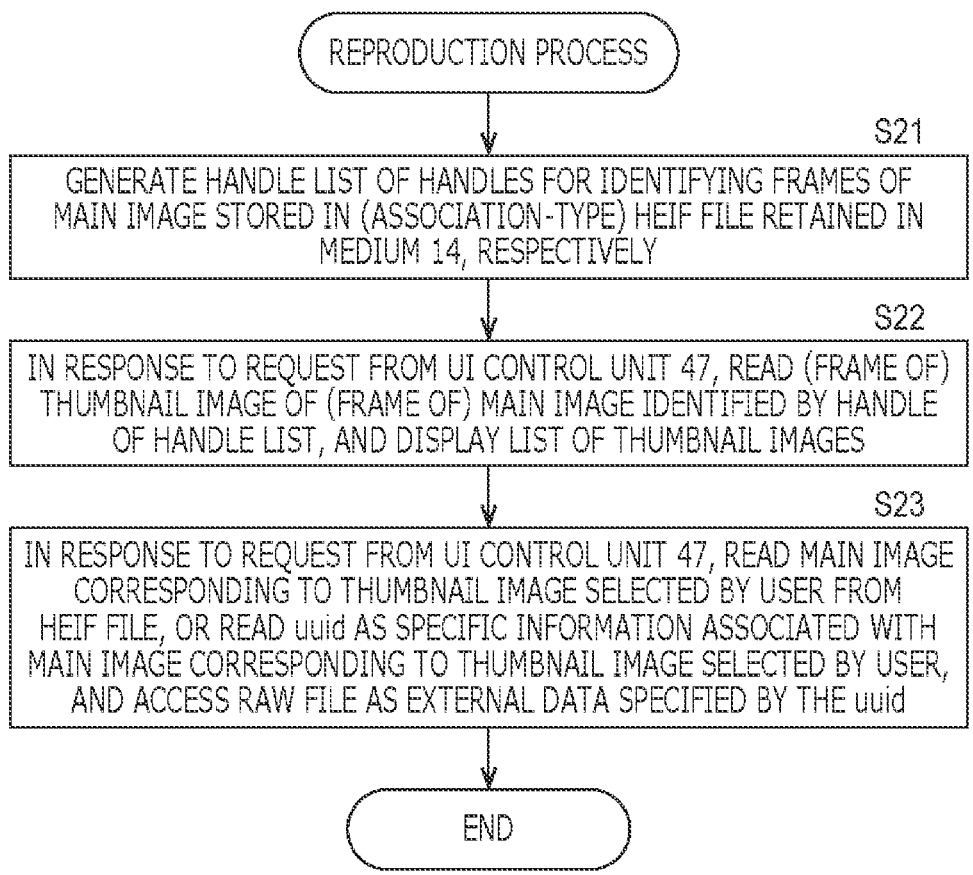
FIG. 16 is a flowchart illustrating an outline of an example of a reproduction process of reproducing an association-type HEIF file.

FIG. 16 is a flowchart illustrating an outline of an example of a reproduction process of reproducing an association-type HEIF file.

In the reproduction process, in step S21, the file control unit 43 generates, for example, a handle list of handles for identifying the frames of the main images, respectively, the handles being stored in the HEIF file stored in the medium 14, and the process proceeds to step S22.

Here, the handle of a frame of the main image includes the file name of the HEIF file in which the frame is stored. The handle of a frame (item) of the main image stored in the collection file further includes an item ID of the frame. The handle of a frame or the main image stored in the sequence file includes time-point information of the frame. With the handle of the frame of the main image, the frame for the handle can be uniquely identified (specified).

Note that the handle of a frame of the main image stored in the sequence file can include the track ID of the track including the frame and the order of the frame in the track (where does the frame rank), instead of time-point information of the frame.

The time point information of each frame is unique regardless of whether one or a plurality of tracks including the frames of the main images is stored in the sequence file. Therefore, according to the time-point information of the frame, even if a plurality of tracks is stored in the sequence file, the frame of the time-point information included in the handle can be uniquely specified from the frames constituting the plurality of respective tracks. Therefore, in a case where time-point information of the frame of the main image is included in the handle of the frame, the frame corresponding to the time-point information can be uniquely specified even if there is no track ID of the track where the frame exists.

The handle list can be generated for all the frames of the main images stored in the HE IF file retained in the medium 14, or can be generated for only frames narrowed down under a specific condition such as a frame with a specific creation date and time.

After generating the handle list, the file control unit 43 accesses the HEIF file with reference to the handle list as necessary.

In step S22, for example, the UI control unit 47 waits for the user to, for example, operate the digital camera 10 so that the thumbnail image is displayed, and requests the file control unit 43 to display the thumbnail image. The file control unit 43 reads (the frame of; the thumbnail image of the frame of the main image identified by the handle of the handle list from the HEIF file in response to the request for display of the thumbnail image from the UI control unit 47. Then, the file control unit 43 displays a list of thumbnail images read from the HEIF file on, for example, the liquid crystal panel 19 (FIG. 1), and the process proceeds from step S22 to step S23.

In step S23, for example, after waiting for the user to select (the frame of) a desired thumbnail from the list of thumbnail images, the UI control unit 47 requests the file control unit 43 for the main image corresponding to the thumbnail image selected by the user. In response to the request for the main image from the UI control unit 47, the file control unit 43 reads the main image from the HEIF file. The file control unit 43 can display the main image read from the HEIF file on the liquid crystal panel 19 as necessary.

Alternatively, the UI control unit 47 requests the file control unit 43 to supply the uuid of the RAW file of the main image corresponding to the thumbnail image selected by the user. In response to the request for the uuid from the UI control unit 47, the file control unit 43 reads the uuid from the association-type HEIF file. The file control unit 43 can access the RAN file specified by the uuid read from the association-type HEIF file as necessary.

Figure 17:
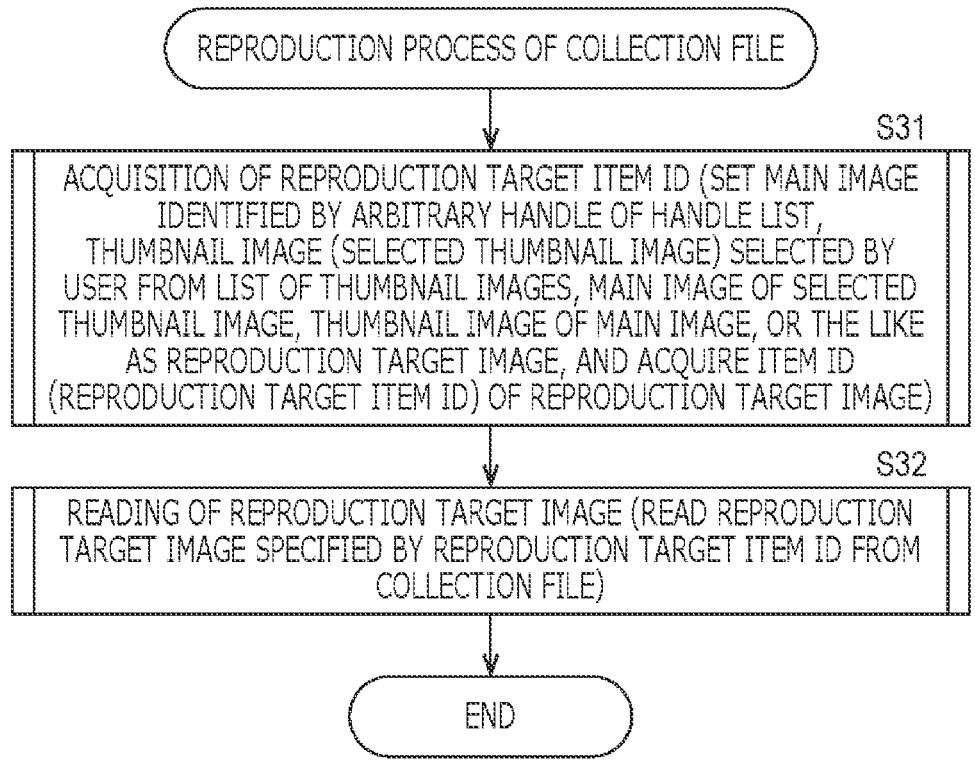
FIG. 17 is a flowchart illustrating an example of a reproduction process of reproducing a collection file.

FIG. 17 is a flowchart illustrating an example of a reproduction process of reproducing a collection file.

In step S31, the file control unit 43 acquires the item ID of the reproduction target image which is an image (item) to be reproduced (hereinafter also referred to as a reproduction target item ID), and the process proceeds to step S32.

In the acquisition of the reproduction target item ID, for example, the main image identified by an arbitrary handle of the handle list, the thumbnail image of the main image, the thumbnail image selected by the user from the list of thumbnail images (hereinafter also referred to as a selected thumbnail image), the main image of the selected thumbnail image, or the like is set as a reproduction target image, and the item ID of the reproduction target image (reproduction target item ID) is acquired.

In step S32, the file control unit 43 reads the reproduction target image in accordance with the reproduction target item ID acquired in step S31.

In the reading of the reproduction target image, the reproduction target image specified by the reproduction target item ID is read from the collection file.

Figure 18:
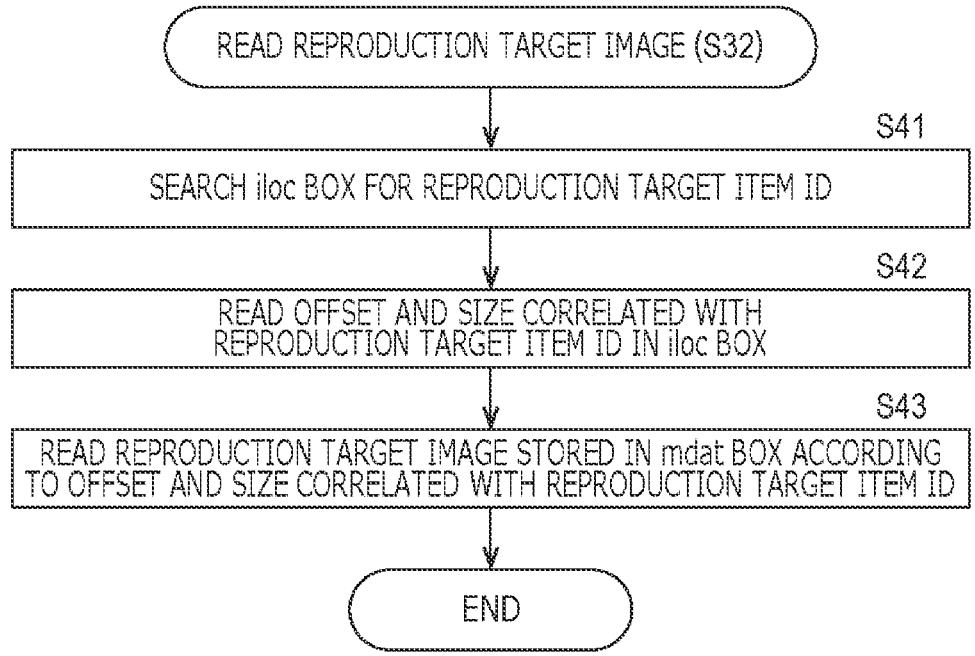
FIG. 18 is a flowchart illustrating an example of the process of reading a reproduction target image in step S32.

FIG. 18 is a flowchart illustrating an example of the process of reading the reproduction target image in step S32 of FIG. 17.

In step S41, the file control unit 43 searches the iloc box of the collection file (FIGS. 9 to 12) for the reproduction target item ID, and the process proceeds to step S42.

In step S42, in the floc box, the file control unit 43 reads the offset and the size correlated with the reproduction target item ID searched for in step S41, and the process proceeds to step S43.

In step S43, the file control unit 43 reads the reproduction target image stored in the mdat box of the collection file according to the offset and the size correlated with the reproduction target item ID, and the process is terminated.

Figure 19:
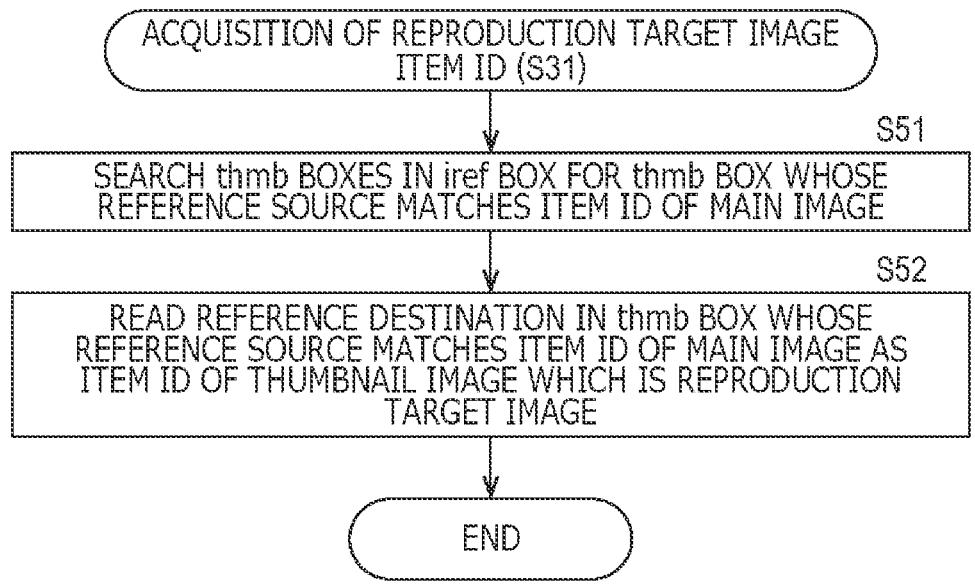
FIG. 19 is a flowchart illustrating a first example of the process of acquiring a reproduction target item ID in step S31.

FIG. 19 is a flowchart illustrating a first example of the process of acquiring the reproduction target item ID in step S31 of FIG. 17.

That is, FIG. 19 illustrates an example of setting a thumbnail image as a reproduction target image and acquiring the item ID of the thumbnail image that is the reproduction target image.

Note that, in FIG. 19, it is assumed that, for example, the file control unit 43 recognizes the item ID of the main image of the thumbnail image as the reproduction target image from the handle.

In step S51, the file control unit 43 searches the thmb boxes in the iref box of the collection file (FIGS. 9 to 12) for the thmb box whose reference source matches the item ID of the main image, and the process proceeds to step S52.

In step S52, the file control unit 43 reads the reference destination in the thmb box whose reference source matches the item ID of the main image, the thumb box having been searched for in step S51, as the item ID of the thumbnail image as the reproduction target image, and the process is terminated.

Figure 20:
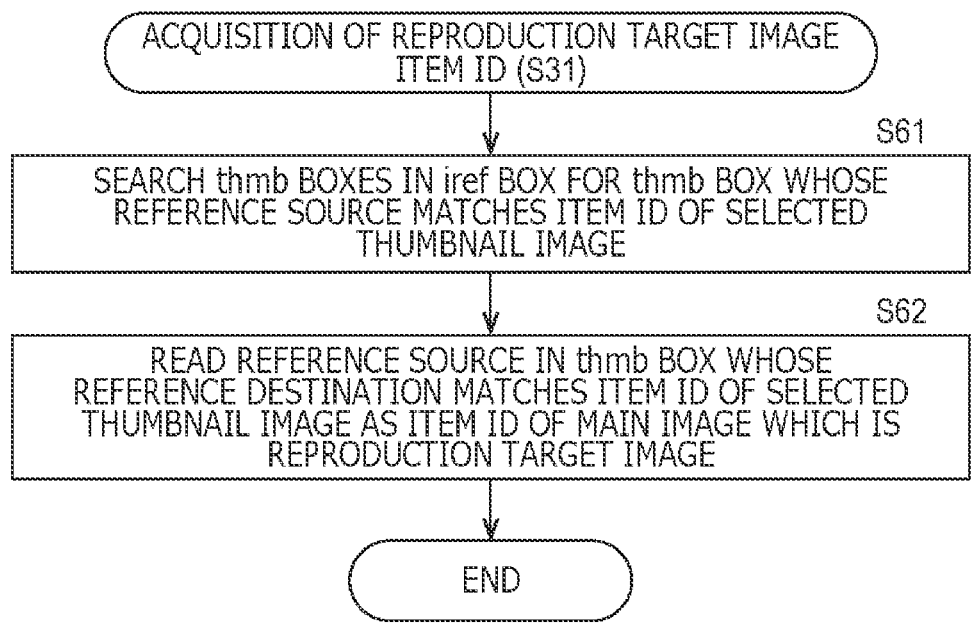
FIG. 20 is a flowchart illustrating a second example of the process of acquiring the reproduction target item ID step S31.

FIG. 20 is a flowchart illustrating a second example of the process of acquiring the reproduction target item ID in step S31 of FIG. 17.

That is, FIG. 20 illustrates an example of setting a main image as a reproduction target image and acquiring the item ID of the main image that is the reproduction target image.

Note that, in FIG. 20, for example, it is assumed that the user selects a thumbnail image (selected thumbnail image) from the list of thumbnail images, and the file control unit 43 recognizes the item ID of the selected thumbnail image.

In step S61, the file control unit 43 searches the thmb boxes in the iref box of the collection file (FIGS. 9 to 12) for the thmb box whose reference destination matches the item ID of the selected thumbnail image, and the process proceeds to step S62.

In step S62, the file control unit 43 reads the reference source in the thmb box whose reference destination matches the item ID of the selected thumbnail image, the thmb box having been searched for in step S61, as the item ID of the main image as the reproduction target image, and the process is terminated.

Figure 21:
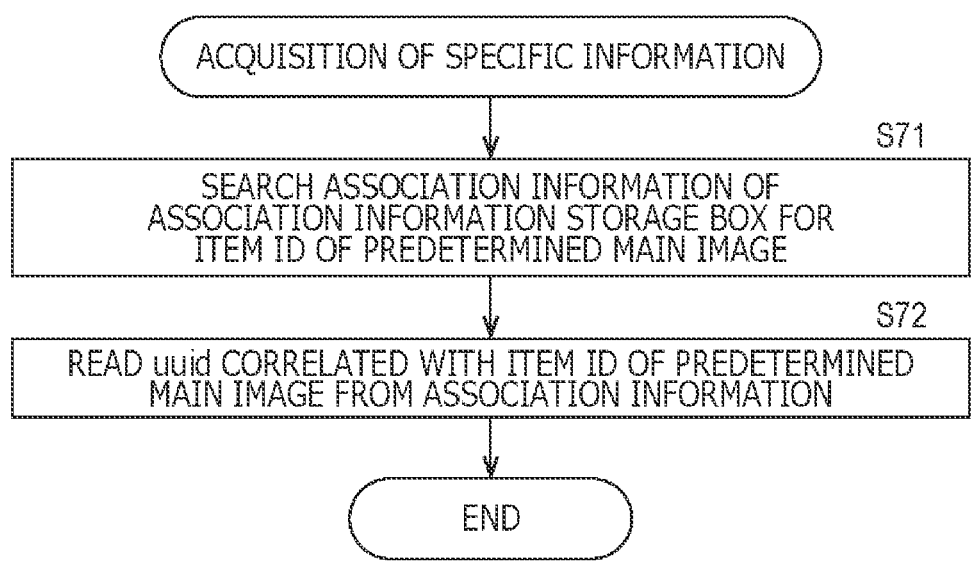
FIG. 21 is a flowchart illustrating an example of the process of acquiring a uuid as specific information of a RAW file of a predetermined main image from the first association-type collection file.

FIG. 21 is a flowchart illustrating an example of the process of acquiring a uuid as specific information of a RAW file of a predetermined main image from the first association-type collection file of FIG. 10.

Note that, in FIG. 21, for example, it is assumed that the file control unit 43 recognizes the item ID of the predetermined main image by using a handle list or the like.

In step S71, the file control unit 43 searches association information in the association information storage box of the first association-type collection file (FIG. 10) for the item ID of the predetermined main image, and the process proceeds to step S72.

In step S72, the file control unit 43 reads the uuid correlated with the item ID of the predetermined main image searched for in step S71 in the association information, and the process is terminated.

The file control unit 43 can access the RAW file of the predetermined main image by using the uuid read as described above.

Figure 22:
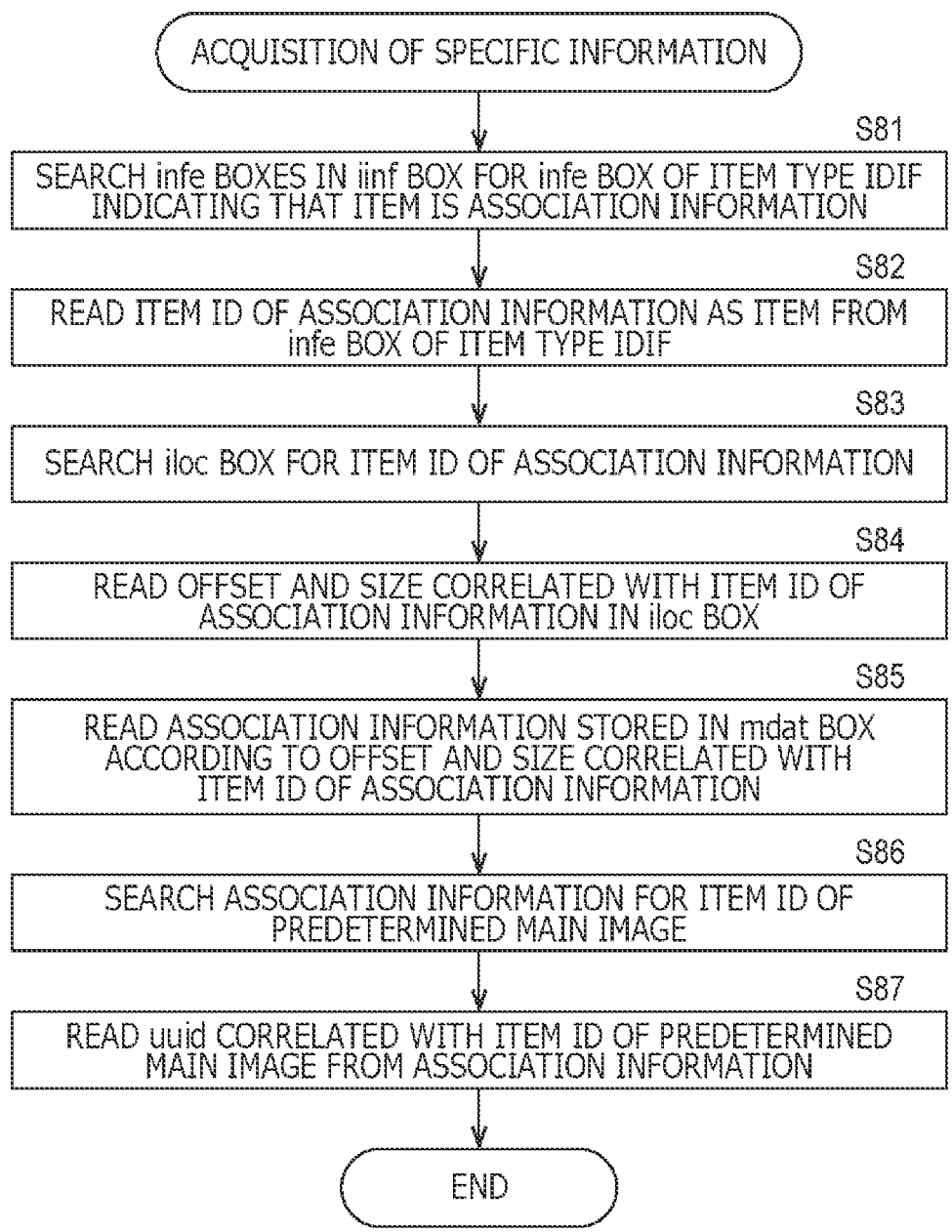
FIG. 22 is a flowchart illustrating an example of the process of acquiring a uuid as specific information of a RAW file of a predetermined main image from a second association-type collection file.

FIG. 22 is a flowchart illustrating an example of the process of acquiring a uuid as specific information of a RAW file of a predetermined main image from the second association-type collection file of FIG. 11.

Note that, in FIG. 22, for example, it is assumed that the file control unit 43 recognizes the item ID of the predetermined main image by using a handle list or the like.

In step S81, the file control unit 43 searches the infe boxes in the iinf box of the second association-type collection file (FIG. 11) for the infe box with the item type IDIF indicating that the item is association information, and the process proceeds to step S82.

In step S82, the file control unit 43 reads the item ID of the association information as an item from the infe box with the item type IDIF searched for in step S81, and the process proceeds to step S83.

In step S83, the file control unit 43 searches the floc box of the second association-type collection file for the item ID of the association information read in step S82, and the process proceeds to step S84.

In step S84, in the iloc box, the file control unit 43 reads the offset and the size correlated with the item ID of the association information searched for in step S83, and the process proceeds to step S85.

In step S85, the file control unit 43 reads association information as an item stored in the mdat box of the second association-type collection file according to the offset and the size correlated with the item ID of the association information, the offset and the size having been read in step S84, and the process proceeds to step S86.

In step S86, the file control unit 43 searches the association information read in step S85 for the item ID of a predetermined main image, and the process proceeds to step S87.

In step S87, the file control unit 43 reads the uuid correlated with the item ID of the predetermined main image searched for in step S86 in the association information, and the process is terminated.

The file control unit 43 can access the RAW file of the predetermined main image by using the uuid read as described above.

Figure 23:
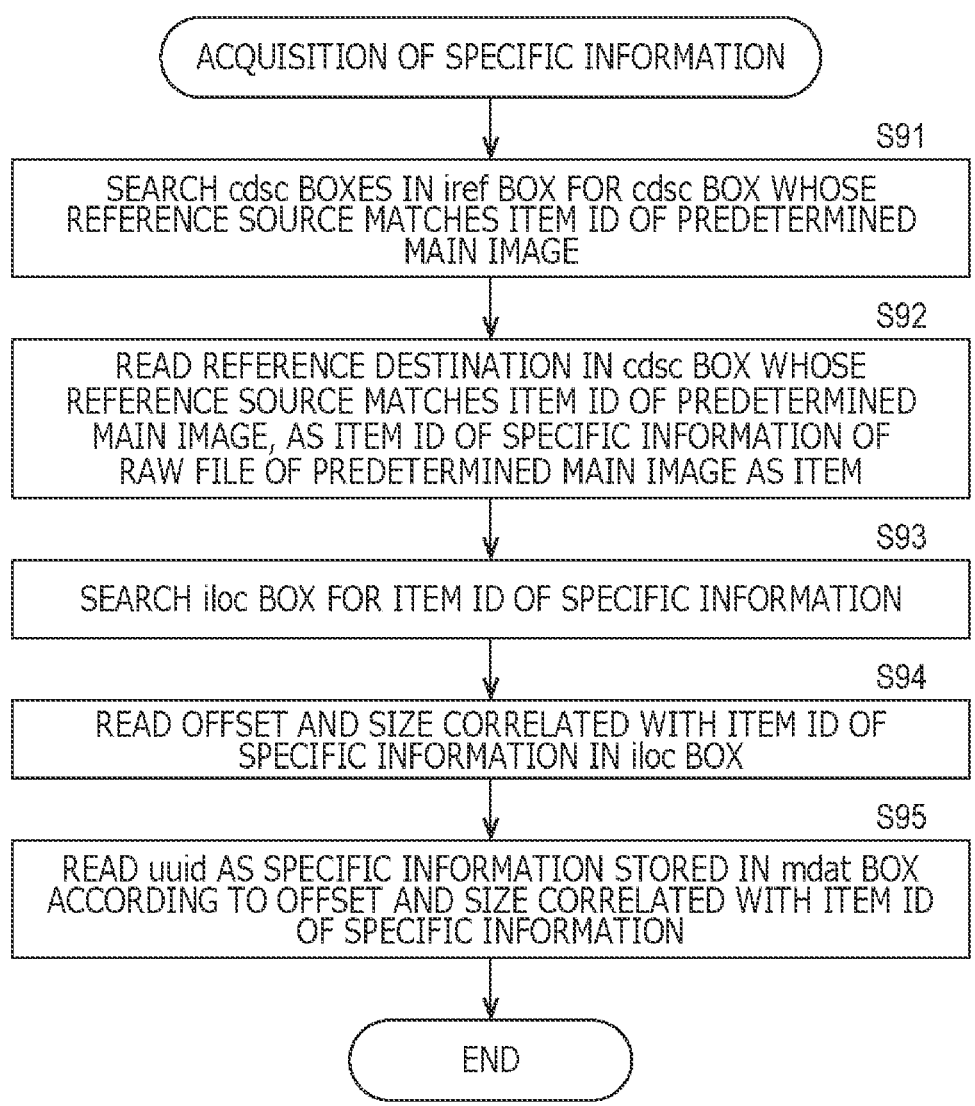
FIG. 23 is a flowchart illustrating an example of the process of acquiring a uuid as specific information of a RAW file of a predetermined main image from a third association-type collection file.

FIG. 23 is a flowchart illustrating an example of the process of acquiring a uuid as specific information of the RAW file of a predetermined main image from the third association-type collection file of FIG. 12.

Note that, in FIG. 23, for example, it is assumed that the file control unit 43 recognizes the item ID of the predetermined main image by using the handle list or the like.

In step S91, the file control unit 43 searches the cdsc boxes in the iref box of the third association-type collection file (FIG. 12) for the cdsc box whose reference source matches the item ID of the predetermined main image, and the process proceeds to step S92.

In step S92, the file control unit 43 reads the reference destination in the cdsc box whose reference source matches the item ID of the predetermined main image, the cdsc box having been searched for in step S91, as the item ID of the specific information of the RAW file of the predetermined main image as an item, and the process proceeds to step S93.

In step S93, the file control unit 43 searches the iloc box of the third association-type collection file for the item ID of the specific information as the item, the item ID having been read in step S92, and the process proceeds to step S94.

In step S94, in the iloc box, the file control unit 43 reads the offset and the size correlated with the item ID of the specific information, the item ID having been searched for in step S93, and the process proceeds to step S95.

In step S95, the file control unit 43 reads the uuid as the specific information of the RAW file of the predetermined main image stored in the mdat box of the third association-type collection file according to the offset and the size correlated with the item ID of the specific information, the offset and the size having been read in step S94, and the process is terminated.

The file control unit 43 can access the RAW file of the predetermined main image by using the uuid read as described above.

Figure 24:
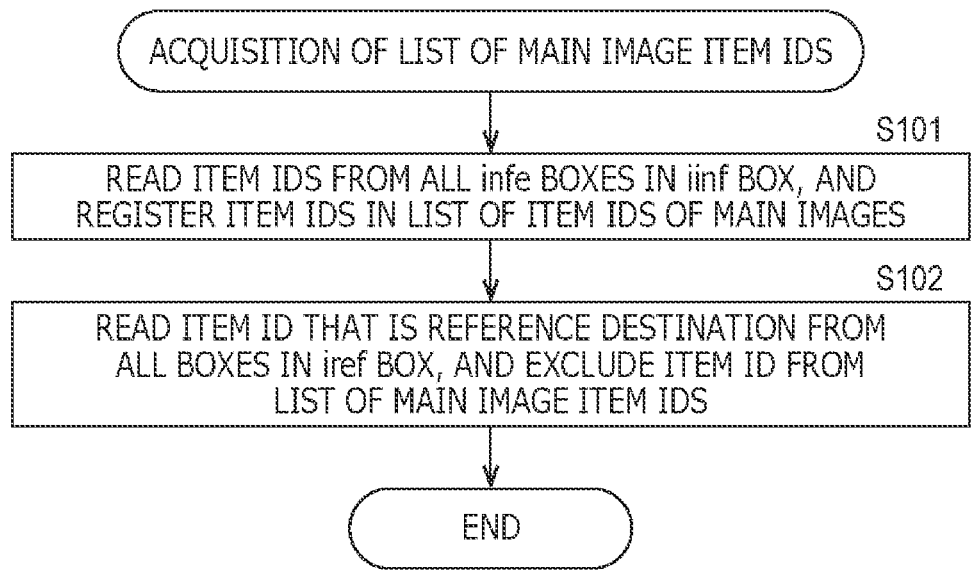
FIG. 24 is a flowchart illustrating an example of the process of acquiring a list of item IDs of main images from a collection file.

FIG. 24 is a flowchart illustrating an example of the process of acquiring the list of item IDs of main images from a collection file.

The process of acquiring the list of the item IDs of the main images from the collection file is performed, for example, in a case where a handle list is generated.

In step S101, the file control unit 43 reads the item IDs from all the infe boxes in the iinf box of the collection file (FIGS. 9 to 12), registers the item IDs in the list of item IDs of the main images (hereinafter also referred to as a main image list), and the process proceeds to step S102.

In step S102, the file control unit 43 reads the item ID that is the reference destination from all the boxes in the iref box of the collection file, excludes the item ID from the main image list, and the process is terminated.

After the above process, the item ID registered in the main image list becomes the item ID of the main image.

Figure 25:
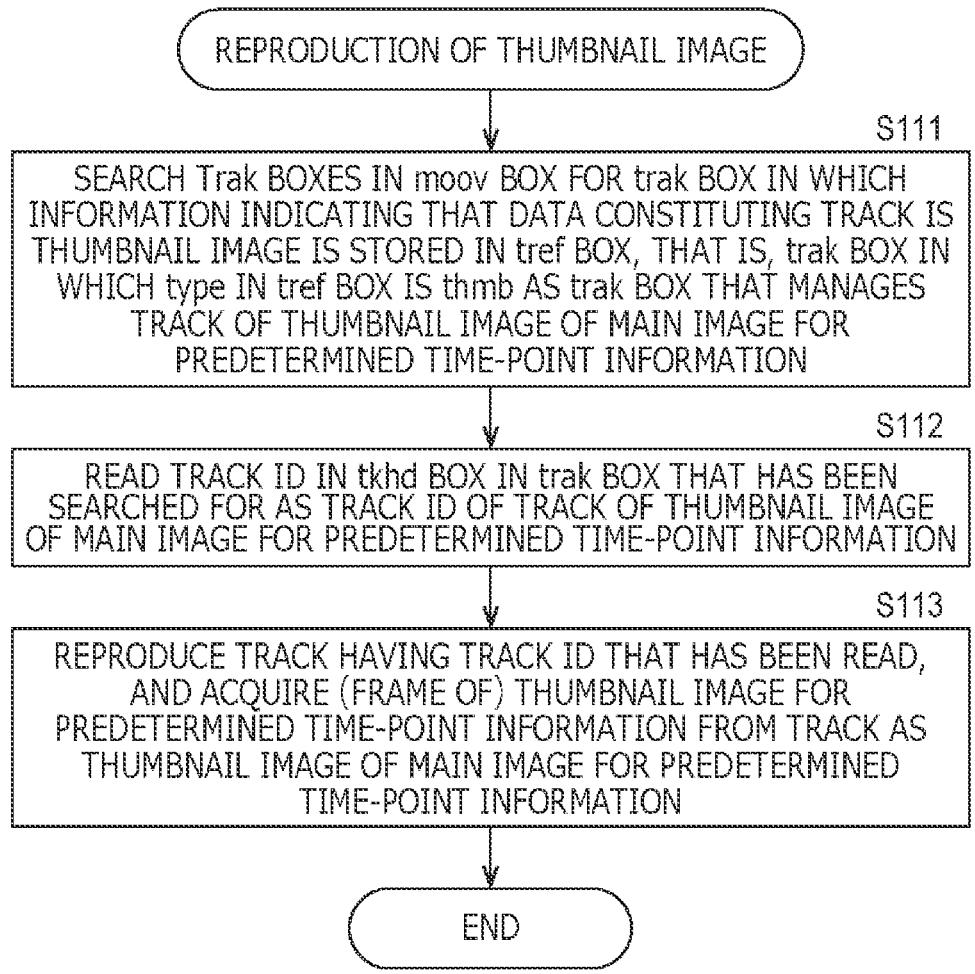
FIG. 25 is a flowchart explaining an example of the process of reproducing a thumbnail image of (frame of) a main image for predetermined time-point information from a sequence file.

FIG. 25 is a flowchart illustrating an example of the process of reproducing the thumbnail image of (the frame of) the main image for predetermined time-point information from a sequence file.

Note that, in FIG. 25, for example, it is assumed that the file control unit 43 recognizes time-point information (or order) of a predetermined main image by using the handle list or the like.

In step S111, the file control unit 43 searches the trak boxes in the moon box of the sequence file (FIGS. 13 and 14) for the trak box in which information indicating that data constituting the track is a thumbnail image is stored in the tref box, that is, the trak box in which the type in the tref box is thmb as the trak box that manages the track of the thumbnail image of the main image for the predetermined time-point information, and the process proceeds to step S112.

In step S112, the file control unit 43 reads the track ID in the tkhd box in the trak box that has been searched for in step S111 as the track ID of the track of the thumbnail image of the main image for the predetermined time-point information, and the process proceeds to step S113.

In step S113, the file control unit 43 reproduces the track having the track ID read in step S112, and acquires (the frame of) the thumbnail image for the predetermined time-point information (or order) from the track as the thumbnail image of the main image for the predetermined time-point information, and the process is terminated.

Note that the process of reproducing the image stored in the sequence file is similar to the process of reproducing the moving image of a MP4 file.

Figure 26:
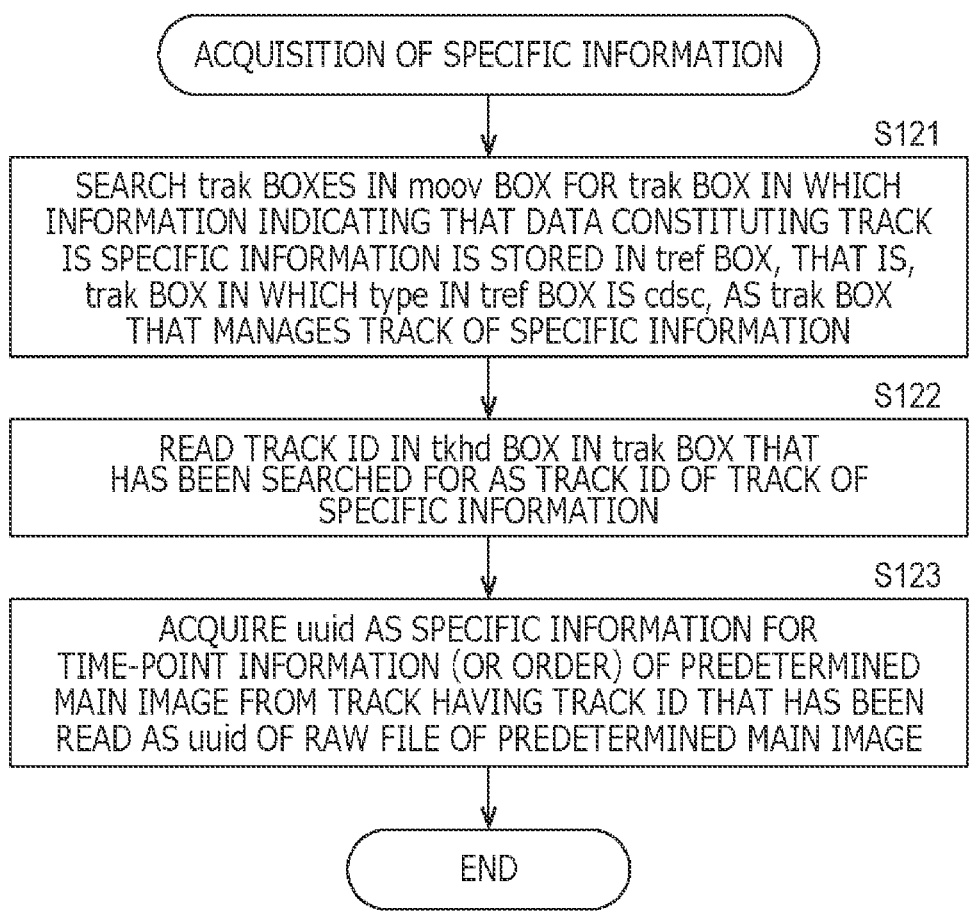
FIG. 26 is a flowchart illustrating an example of the process of acquiring a uuid as specific information of a RAW file of (frame of) a predetermined main image from an association-type sequence file.

FIG. 26 is a flowchart illustrating an example of the process of acquiring a uuid as specific information of a RAW file of (the frame of) a predetermined main image from an association-type sequence file.

Note that, in FIG. 26, for example, it is assumed that the file control unit 43 recognizes time-point information (or order) of the predetermined main image by using the handle list or the like.

In step S121, the file control unit 43 searches the trak boxes in the moot box of the association-type sequence file (FIG. 14) for the trak box in which information indicating that data constituting the track is specific information is stored in the tref box, that is, the trak box which the type in the tref box is cdsc, as the trak box that manages the track of the specific information, and the process proceeds to step S122.

In step S122, the file control unit 43 reads the track ID in the tkhd box in the trak box that has been searched for in step S121 as the track ID of the track of the specific information, and the process proceeds Co step S123.

In step S123, the file control unit 43 acquires the uuid as specific information for the time-point information (or order) of the predetermined main image from the track having the track ID read in step S122 as the uuid of the RAW file of the predetermined main image, and the process is terminated.

The file control unit 43 can access the RAW file of the predetermined main image by using the uuid acquired as described above.

As described above, the file control unit 43 generates and reproduces an association-type HEIF file in which a main image in an HEIF file compliant with HEIF and specific information that specifies the external data outside the HEIF file, the external data to be associated with the main image, are stored in association with each other in the HEIF file. Therefore, the main image stored in the HEIF file can be associated with the external data outside the HEIF file.

Furthermore, in a case where a uuid is used as specific information, even if the file name of external data is changed, association between a main image in an HEIF file and the external data whose file name has been changed can be maintained by the uuid.

Storage of Specific Information Allocated to External Data

Figure 27:
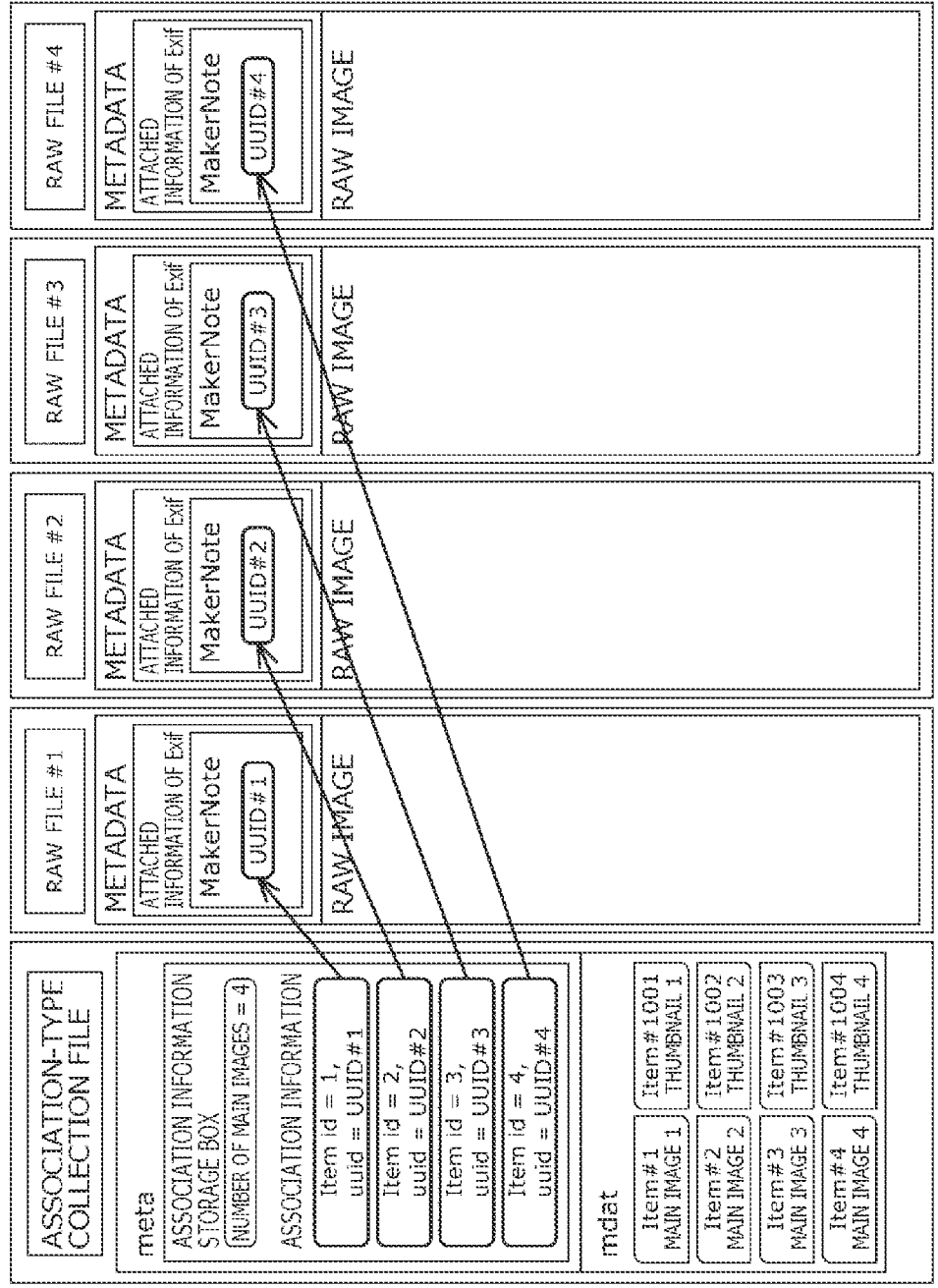
FIG. 27 is a diagram illustrating an example of storing a uuid in a RAW file of a main image in a case where the RAW file is adopted as external data and an association-type collection file is generated.

FIG. 27 is a diagram illustrating an example of storing a uuid in a RAW file of a main image in a case where the RAW file is adopted as external data and an association-type collection file is generated.

Note that, in FIG. 27, the first association-type collection file is adopted as the association-type collection file.

The RAW file has a region called a marker note (Maker-Note) as a partial region of the region for storing attached information of Exif as metadata.

The file control unit 43 can store the uuid allocated to the RAW file in, for example, the MakerNote of the RAW file.

In FIG. 27, main images Item #1, Item #2, Item 83, and Item #4 as four items are stored in the association-type collection file, and RAW files #1, #2, #3, and #4 in which RAW images of the main images item #1, Item #2, Item #3, and Item #4 are stored, respectively, are generated. Then, a UUID #1 is allocated to the RAW file #1, and as association information associating the main image Item #1 with the UUID #1 of the RAW file #1 of the main image Item #i, association information associating the item ID #i specifying the main image Item #i with the UUID 41 of the RAW file #i associated with the main image Item #i is stored in an association information storage box.

Figure 28:
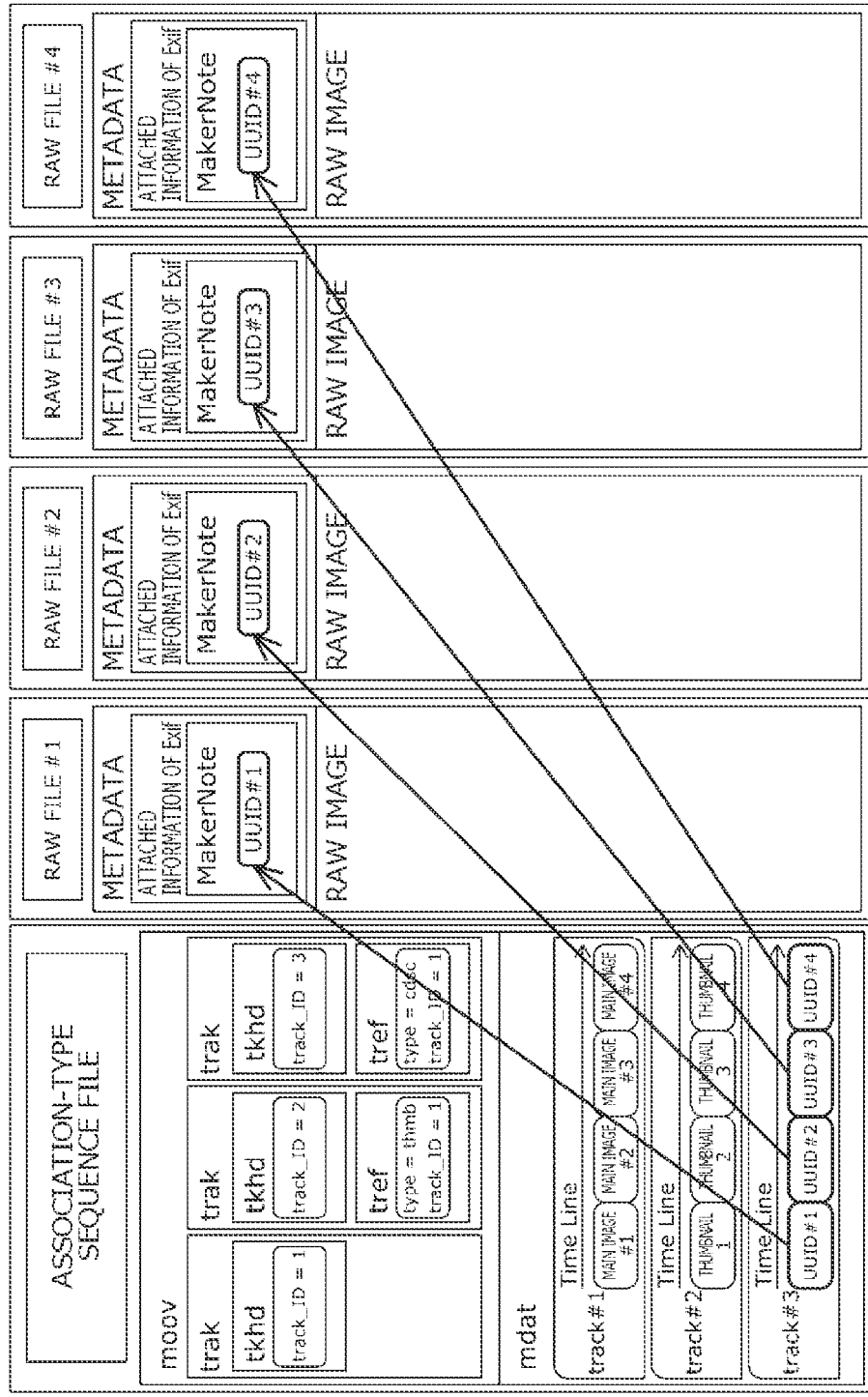
FIG. 28 is a diagram illustrating an example of storing a uuid in a RAW file of a main image in a case where the RAW file is adopted as external data and an association-type sequence file is generated.

FIG. 28 is a diagram illustrating an example of storing a uuid in a RAW file of a main image in a case where the RAN file is adopted as external data and an association-type sequence file is generated.

The file control unit 43 can store a uuid allocated to a RAW file in the MakerNote of the RAW file also in the case of generating an association-type sequence file, similarly to the case of generating an association-type collection file illustrated in FIG. 27.

In FIG. 28, a track #1 including main images #1, #2, #3, and #4 as four frames is stored in the association-type sequence file, and RAW files #1, #2, #3, and #4 in which RAW images of the main images #1, #2, #3, and #4 are stored, respectively, are generated. Then, a UUID #i is allocated to the RAW file #i, and a track #3 arranged and configured such that the UUID #i of the RAW file #i has the same time-point information as that of the main image #i corresponding to the RAW file #i is stored in the association-type sequence file.

As described above, the track #3 is configured such that the UUID V of the RAW file #i is arranged so as to have the same time-point information as that of the main image ii corresponding to the RAW file #i, so that the ith main image #i of the track #1 and the ith #i of the track #3, that is, the UUID V of the RAW file #i of the main image #i are associated with each other and stored in the association-type sequence file.

In the above description, the RAW file of a main image is adopted as external data; however, other data can be adopted as external data. As the external data, for example, a file or the like in which audio (sound) recorded together with imaging of a main image is stored can be adopted. As a file in which audio is stored, for example, a WAV file in a WAV format, an MP4 file in an MP4 format, or the like can be adopted. Hereinafter, it is assumed that as a file in which audio is stored, for example, a WAV file is adopted.

Figure 29:
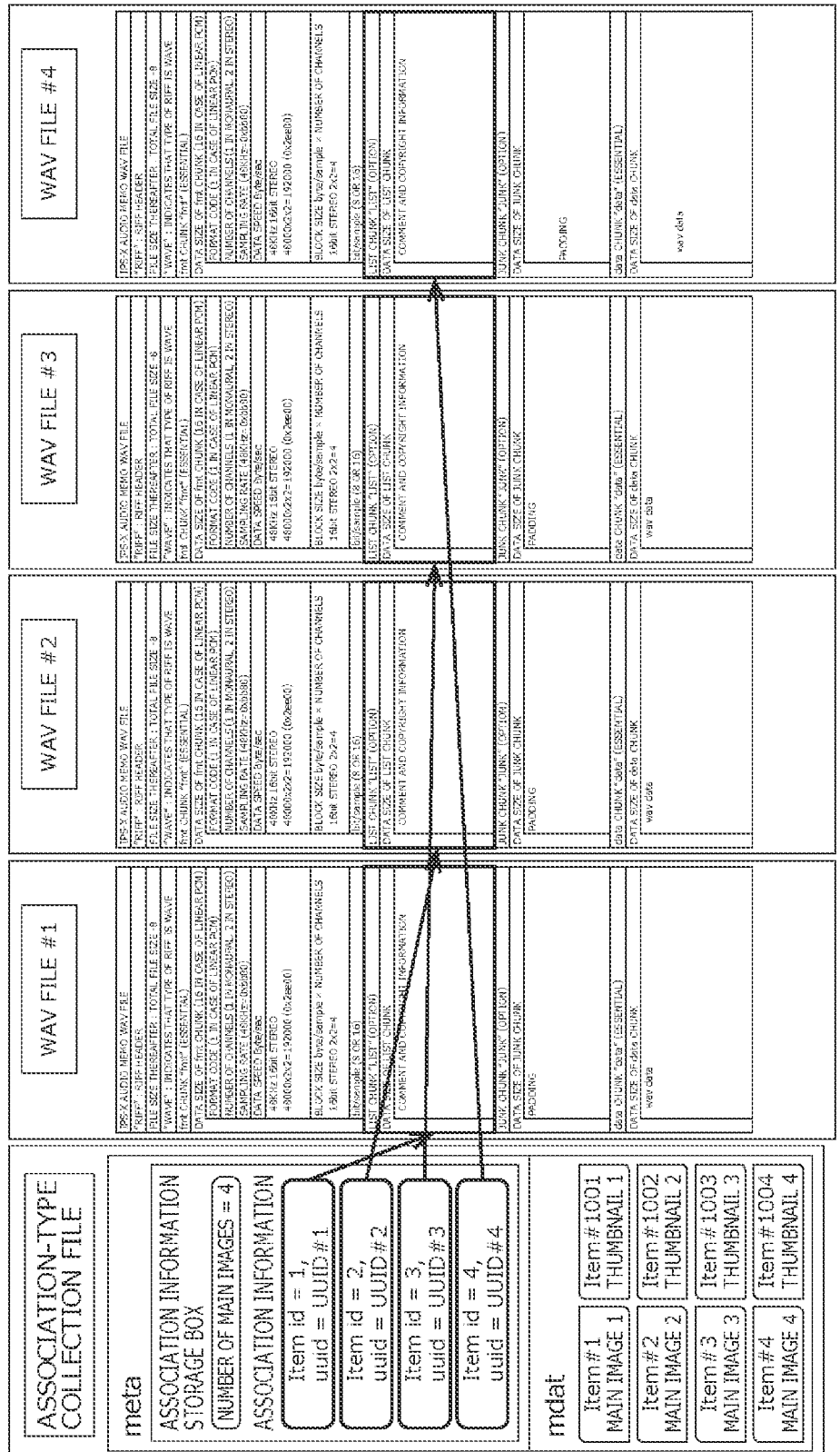
FIG. 29 is a diagram illustrating an example of storing a uuid in a WAV file of a main image in a case where the WAV file is adopted as external data and an association-type collection file is generated.

FIG. 29 is a diagram illustrating an example of storing a uuid in a WAV file (WAV file in which audio recorded together with imaging of a main image is stored) of the main image, in a case where the WAV file is adopted as external data and an association-type collection file is generated.

Note that, in FIG. 29, the first association-type collection file is adopted as the association-type collection file.

The WAV file has a region called a List chunk as a partial region of the region in which metadata is described.

The file control unit 43 can store a uuid allocated to a WAV file in, for example, the List chunk of the WAV file.

In FIG. 29, main images Item #1, Item #2, Item #3, and Item #4 as four items are stored in the association-type collection file, and WAV files #1, #2, #3, and #4 of the main images item #1, Item #2, item #3, and Item #4 are generated. Then, a UUID #i is allocated to the WAV file #i, and as association information associating the main image Item #i with the UUID #i of the WAV file #1 of the main image Item #i, association information associating the item ID #i specifying the main image item #i with the UUID #i of the WAV file #i associated with the main image Item #1 is stored in an association information storage box.

Figure 30:
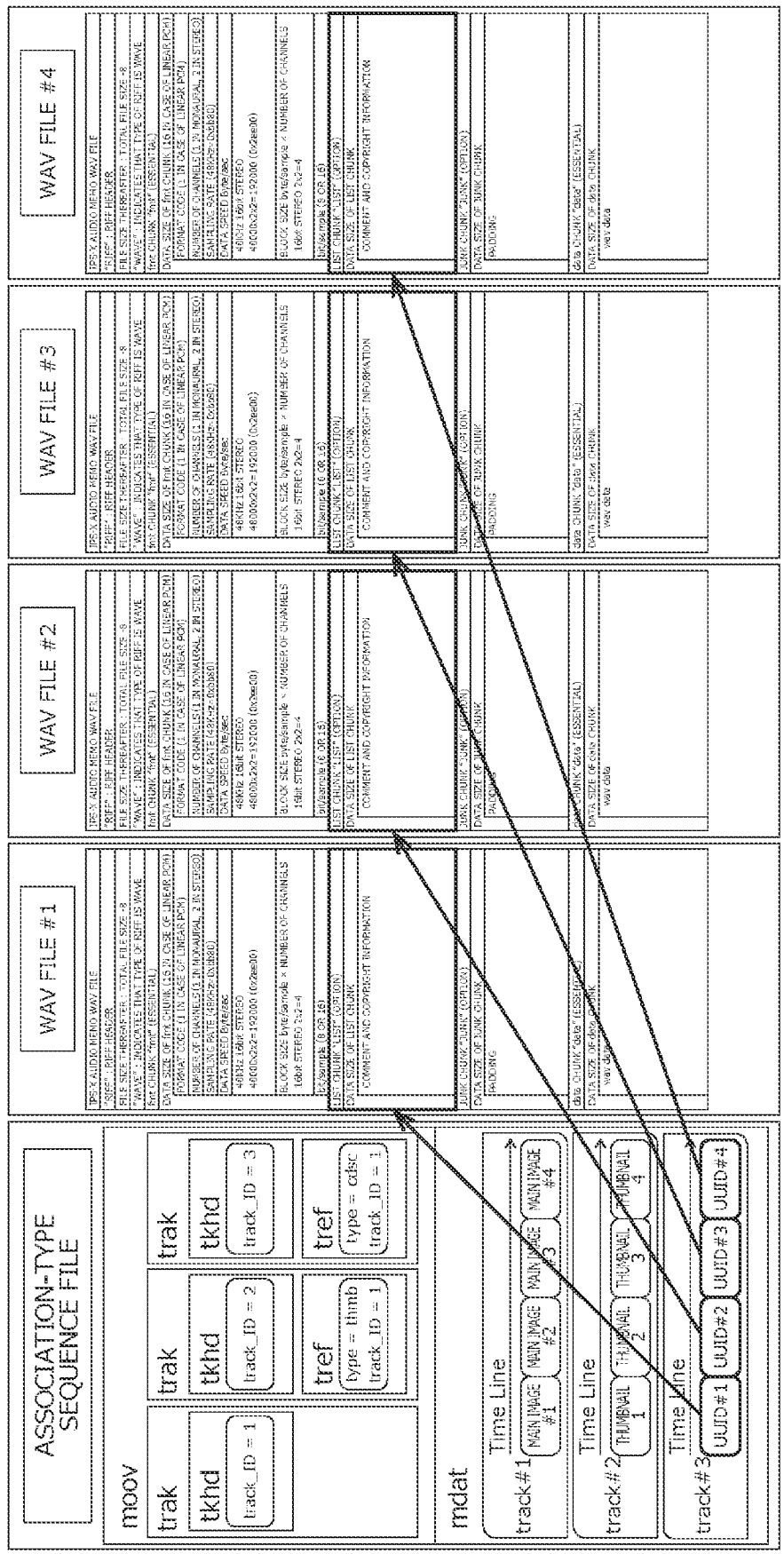
FIG. 30 is a diagram illustrating an example of storing a uuid in a WAV file of a main image in a case where the WAV file is adopted as external data and an association-type sequence file is generated.

FIG. 30 is a diagram illustrating an example of storing a uuid in a WAV file of a main image in a case where the WAV file is adopted as external data and an association-type sequence file is generated.

Even in the case of Generating an association-type sequence file, the file control unit 43 can store a uuid allocated to a WAV file in the List chunk of the WAV file, similarly to the case of generating the association-type collection file illustrated in FIG. 29.

In FIG. 30, a track #1 including main images #1, #2, #3, and #4 as four frames is stored in the association-type sequence file, and WAV files #1, #2, #3, and #4 of the main images #1, #2, #3, and #4 are generated. Then, a UUID #1 is allocated to the WAV file #i, and a track #3 arranged and configured such that the UUID #i of the RAW file #i has the same time-point information as that of the main image #i corresponding to the RAN file #1 is stored in the association-type sequence file.

As described above, the track #3 is configured such that the UUID #i of the RAW file #i is arranged so as to have the same time-point information as that of the main image #i corresponding to the RAW file #i, so that the ith main image #i of the track #1 and the ith UUID #i of the track #3, that is, the UUID #i of the WAV file #i of the main image #i are associated with each other and stored in the association-type sequence file.

Note that, in addition to the HEIF file, the present technology can be applied to, for example, an ISO base media file, an MP4 file, a Miaf file, or the like having a box structure other than the HEIF file.

Furthermore, the present technology can be applied to, for example, a file or the like in which an image (main image) and another image in which the resolution of the image is reduced are stored, the file or the like having no box structure.

Moreover, the present technology can be applied to a case where external data is associated with a screen nail image or a thumbnail image in an HEIF file, in addition to a case where external data is associated with a main image in the HEIF file.

Furthermore, the present technology can also be applied, for example, to a case where external data is associated with internal data other than an image such as a main image in an HEIF file.

Description of Computer to Which Present Technology is Applied

Next, a series of processes of each block constituting the signal processing unit 13 (FIG. 1) such as the file control unit 43 described above and the like can be performed by hardware or can be performed by software. In a case where the series of processes is performed by software, a program that configures the software is installed on a computer or the like.

Figure 31:
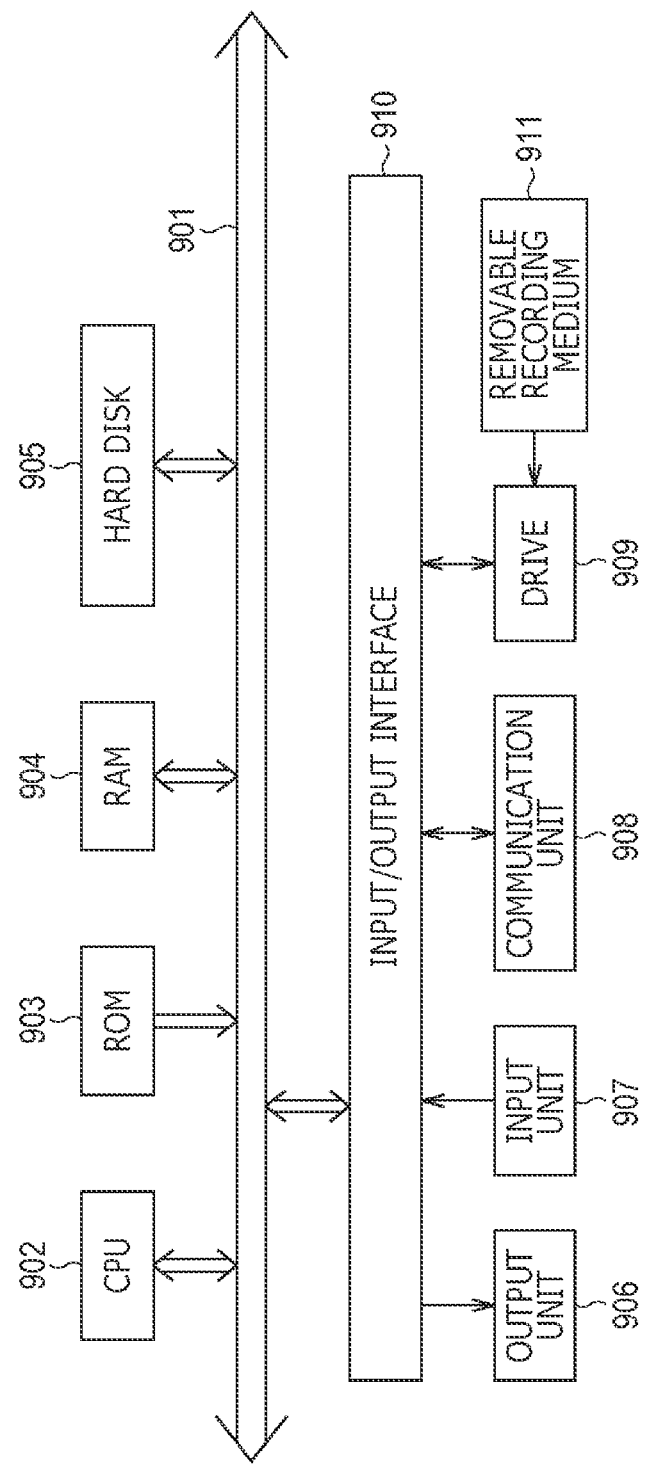
FIG. 31 is a block diagram illustrating a configuration example of an embodiment of a computer to which the present technology is applied.

FIG. 31 is a block diagram illustrating a configuration example of an embodiment of a computer on which a program for executing the above-described series of processes is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a compact disc read only memory (CD-ROM), a magneto optical (MO) disk, a digital versatile disc (DVD), a magnetic disk, a semiconductor memory, and the like.

Note that the program can be installed on the computer from the removable recording medium 911 as described above, and in addition, can be downloaded to the computer via a communication network or a broadcast network and installed on the built-in hard disk 905. That is, for example, the program can be wirelessly transmitted from a download site to the computer via an artificial satellite for digital satellite broadcasting, or can be transmitted by wire to the computer via a network such as a local area network (LAN) or the Internet.

The computer incorporates a central processing unit (CPU) 902, and an input/output interface 910 is connected to the CPU 902 via a bus 901.

When a command is input according to operation of an input unit 907 or the like via the input/output interface 910 by a user, the CPU 902 executes a program stored in a read only memory (ROM) 903 according to the command. Alternatively, the CPU 902 loads the program stored in the hard disk 905 into a random access memory (RAM) 904 and executes the program.

Therefore, the CPU 902 performs the processes according to the above-described flowcharts or the processes performed by the configuration of the above-described block diagram. Then, the CPU 902 outputs the processing result from the output unit 906 or transmits the processing result from the communication unit 908 via the input/output interface 910, or furthermore, for example, records the processing result in the hard disk 905, as necessary.

Note that the input unit 907 includes a keyboard, a mouse, a microphone, or the like. Furthermore, the output unit 906 includes a liquid crystal display (LCD), a speaker, or the like.

Here, in the present Description, the processes performed by the computer according to the program do not necessarily have to be performed in time series in the order described as the flowcharts. That is, the processes performed by the computer according to the program also include processes executed in parallel or individually (for example, parallel processing or processing by an object).

Furthermore, the program may be processed by one computer (processor) or may be subjected to distributed processing by a plurality of computers. Moreover, the program may be transferred to a remote computer and executed.

Moreover, in the present Description, a system means a set of a plurality of constituents (devices, modules (components), or the like), and it does not matter whether or not all the constituents are in the same case. Therefore, each of a plurality of devices housed in separate cases and connected via a network, and one device in which a plurality of modules is housed in one case is a system.

Note that the embodiments of the present technology are not limited to the above-described embodiments, and various modifications can be made without departing from the scope of the present technology.

For example, the present technology can adopt a configuration of cloud computing in which one function is shared and processed jointly by a plurality of devices via a network.

Furthermore, each step described in the above-described flowcharts can be executed by one device, or can be shared and executed by a plurality of devices.

Moreover, in a case where a plurality of processes is included in one step, the plurality of processes included in the one step can be shared and executed by a plurality of devices in addition to being executed by one device.

In addition, the effects described in the present Description are illustrations only and not limited, and may have other effects.

Note that the present technology can also be configured as follows.

<1>

A file generation device including
a file control unit that generates an association-type high efficiency image file format (HEIF) file in which an image in an HEIF file compliant with HEIF and specific information that specifies external data outside the HEIF file, the external data to be associated with the image, are stored in association with each other.

<2>

The file generation device according to <1>, in which the file control unit generates the association-type HEIF file in which association information that associates the image with specific information of the external data is stored.

<3>

The file generation device according to <2>, in which the file control unit stores the association information is which an item ID that specifies the image is correlated with the specific information in the association-type HEIF file.

<4>

The file generation device according to <3>, in which the file control unit stores the association information in a meta box or an mdat box of the association-type HEIF file.

<5>

The file generation device according to <2>, in which the file control unit stores the specific information in an mdat box of the association-type HEIF file, and stores the association information in which an item ID that specifies the image and an item ID that specifies the specific information stored in the mdat box are correlated with each other, in a meta box of the association-type HEIF file.

<6>

The file generation device according to <1>, in which the file control unit stores a track of specific information of the external data associated with each frame constituting a track of the image, in an mdat box of the association-type HEIF file.

<7>

The file generation device according to <6>, in which each frame constituting the track of the image and specific information constituting the track of the specific information are associated with each other by time-point information on a time line or an order of arrangement in the tracks.

<8>

The file generation device according to any one of <1> to <7>, in which the image and another image based on the image are stored in the association-type HEIF file.

<9>

A file generation method including generating an association-type high efficiency image file format (HEIF) file in which an image in an HEIF file compliant with HEIF and specific information that specifies external data outside the HEIF file, the external data to be associated with the image, are scored in association with each other.

<10>

A program for causing a computer to function as a file control unit that generates an association-type high efficiency image file format (HEIF) file in which an image in an HEIF file compliant with HEIF and specific information that specifies external data outside the HEIF file, the external data to be associated with the image, are stored in association with each other.

<11>

A file reproduction device including a file control unit that reproduces an association-type high efficiency image file format (HEIF) file in which an image in an HEIF file compliant with HEIF and specific information that specifies external data outside the HEIF file, the external data to be associated with the image, are stored in association with each other.

<12>

The file reproduction device according to <11>, in which the file control unit reads specific information of the external data associated with a predetermined image from the association-type HEIF file in which association information that associates the image with the specific information of the external data is stored.

<13>

The file reproduction device according to <12>, in which the association information in which an item ID that specifies the image and the specific information are correlated with each other is stored in the association-type HEIF file, and the file control unit reads the specific information correlated with an item ID of a predetermined image in the association information.

<14>

The file reproduction device according to <13>, in which the association information is stored in a meta box or as mdat box of the association-type HEIF file, and the file control unit reads the specific information correlated with an item ID of a predetermined image in the association information from the meta box or the mdat box.

<15>

The file reproduction device according to <12>, in which the specific information is stored in an mdat box of the association-type HEIF file, and the association information is which an item ID for specifying the image is correlated with an item ID for specifying the specific information stored in the mdat box is stored in a meta box of the association-type HEIF file, and the file control unit reads, from the mdat box, the specific information specified by the item ID of the specific information correlated with an item ID of a predetermined image in the association information stored in the meta box.

<16>

The file reproduction device according to <11>, in which a track of specific information of the external data associated with each frame constituting a track of the image is stored in an mdat box of the association-type HEIF file, and each frame constituting the track of the image and specific information constituting the track of the specific information are associated with each other by time-point information on a time line or an order of arrangement in the tracks, and the file control unit acquires the specific information for time-point information on a time line of a predetermined frame or an order of arrangement of the predetermined frame in the track from the track of the specific information.

<17>

The file reproduction device according to any one of <11> to <16>, in which the image and another image based on the image are stored in the association-type HEIF file.

<18>

A file reproduction method including reproducing an association-type high efficiency image file format (HEIF) file in which an image in an HEIF file compliant with HEIF and specific information that specifies external data outside the HEIF file, the external data to be associated with the image, are stored in association with each other.

<19>

A program for causing a computer to function as a file control unit that reproduces an association-type high efficiency image file format (HEIF) file in which an image in an HEIF file compliant with HEIF and specific information that specifies external data outside the HEIF file, the external data to be associated with the image, are stored in association with each other.

REFERENCE SIGNS LIST

10 Digital camera
11 Optical system

13 Signal processing unit
14 Medium
15, 16 Interface
17 Button/Key
18 Touch panel
19 Liquid crystal panel
20 View finder
21 Interface
41 Optical system/Image sensor control unit
42 Encoding control unit
43 File control unit
44 Medium control unit
45 Operation control unit
46 Display control unit
47 UI control unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A file generation device comprising:
a file control unit that generates an association-type high efficiency image file format (HEIF) file in which a plurality of images in an HEIF file compliant with HEIF are stored in association with specific information that specifies external data outside the association-type HEIF file, wherein the specific information is a plurality of data identifiers that identify the external data, and wherein the association-type HEIF file includes association information that includes an image identifier of each of the plurality of images correlated with one of the plurality of data identifiers.

2. The file generation device according to claim 1, wherein the file control unit stores the association information in a meta box or an mdat box of the association-type HEIF file.

3. The file generation device according to claim 1, wherein the file control unit
stores the specific information in an mdat box of the association-type HEIF file, and
stores the association information in a meta box.

4. The file generation device according to claim 1, wherein the file control unit stores a track of the plurality of data identifiers in an mdat box of the association-type HEIF file.

5. The file generation device according to claim 4, wherein the file control unit stores a second track of the plurality of images in the mdat box of the association-type HEIF file, and wherein each frame constituting the second track and the track of the plurality of data identifiers are associated with each other by time-point information on a time line or an order of arrangement in the respective tracks.

6. The file generation device according to claim 1, wherein the plurality of images include a first image and a second image, wherein the second image is based on the first image.

7. The file generation device according to claim 1, wherein the external data is one of a plurality of raw image files or a plurality of audio files.

8. The file generation device according to claim 7, wherein the plurality of audio files are in a Waveform Audio (WAV) file format.

9. The file generation device according to claim 1, wherein the plurality of images include a plurality of main images and a plurality of thumbnail images, wherein each of the plurality of thumbnail images is based on one of the plurality of main images.

10. A file generation method comprising:
determining, with an electronic processor, a plurality of image identifiers that identify a plurality of images compliant with high efficiency image file format (HEIF);
determining, with the electronic processor, specific information that specifies external data; and
generating, with the electronic processor, an association-type high efficiency image file format (HEIF) file in which the plurality of images are stored in association with the specific information,
wherein the external data is external to the association-type HEIF file,
wherein the specific information is a plurality of data identifiers that identify the external data, and
wherein the association-type HEIF file includes association information that includes each of the plurality of image identifiers correlated with one of the plurality of data identifiers.

11. A non-transitory computer-readable medium comprising a program that, when executed by an electronic processor, causes the electronic processor to perform a set of operations comprising:
determining a plurality of image identifiers that identify a plurality of images compliant with high efficiency image file format (HEIF);
determining specific information that specifies external data; and
generating an association-type high efficiency image file format (HEIF) file in which the plurality of images are stored in association with the specific information,
wherein the external data is external to the association-type HEIF file,
wherein the specific information is a plurality of data identifiers that identify the external data, and
wherein the association-type HEIF file includes association information that includes each of the plurality of image identifiers correlated with one of the plurality of data identifiers.

12. A file reproduction device comprising:
a file control unit that reproduces an association-type high efficiency image file format (HEIF) file in which a plurality of images in an HEIF file compliant with HEIF are stored in association with specific information that specifies external data outside the association-type HEIF file, wherein the specific information is a plurality of data identifiers that identify the external data, and wherein the association-type HEIF file includes association information that includes an image identifier of each of the plurality of images correlated with one of the plurality of data identifiers.

13. The file reproduction device according to claim 12, wherein the file control unit reads a portion of the specific information of the external data associated with a predetermined image from the association-type HEIF file.

14. The file reproduction device according to claim 13, wherein
the file control unit reads a data identifier from the plurality of data identifiers correlated with a first image identifier of the predetermined image in the association information.

15. The file reproduction device according to claim 14, wherein the association information is stored in a meta box or an mdat box of the association-type HEIF file, and
the file control unit reads the data identifier from the plurality of data identifiers correlated with the image identifier of the predetermined image in the association information from the meta box or the mdat box.

16. The file reproduction device according to claim 13, wherein the specific information is stored in an mdat box of the association-type HEIF file, and
the association information is stored in a meta box of the association-type HEIF file, and
the file control unit reads, from the mdat box, one of the plurality of data identifiers correlated with a first image identifier of the predetermined image of the plurality of images.

17. The file reproduction device according to claim 12, wherein a track of the plurality of data identifiers is stored in an mdat box of the association-type HEIF file,
wherein a second track of the plurality of images is stored in the mdat box,
wherein each frame constituting the second track and the track of the plurality of data identifiers are associated with each other by time-point information on a time line or an order of arrangement in the respective tracks, and
the file control unit acquires time-point information on the time line of a predetermined frame or the order of arrangement of the predetermined frame from the track of the plurality of data identifiers.

18. The file reproduction device according to claim 12, wherein the plurality of images includes a first image and a second image based on the first image.

19. A file reproduction method comprising:
determining, with an electronic processor, a plurality of image identifiers that identify a plurality of images compliant with high efficiency image file format (HEIF);
determining, with the electronic processor, specific information that specifies external data; and
reproducing, with the electronic processor, an association-type high efficiency image file format (HEIF) file in which the plurality of images are stored in association with the specific information,
wherein the external data is external to the association-type HEIF file,
wherein the specific information is a plurality of data identifiers that identify the external data, and
wherein the association-type HEIF file includes association information that includes each of the plurality of image identifiers correlated with one of the plurality of data identifiers.

20. A non-transitory computer-readable medium comprising a program that, when executed by an electronic processor, causes the electronic processor to perform a set of operations comprising:
determining a plurality of image identifiers that identify a plurality of images compliant with high efficiency image file format (HEIF);
determining specific information that specifies external data; and
reproducing an association-type high efficiency image file format (HEIF) file in which the plurality of images are stored in association with the specific information,
wherein the external data is external to the association-type HEIF file,
wherein the specific information is a plurality of data identifiers that identify the external data, and
wherein the association-type HEIF file includes association information that includes each of the plurality of image identifiers correlated with one of the plurality of data identifiers.

* * * * *